(12) United States Patent
Gillies et al.

(10) Patent No.: US 9,445,136 B2
(45) Date of Patent: Sep. 13, 2016

(54) SIGNALING CHARACTERISTICS OF SEGMENTS FOR NETWORK STREAMING OF MEDIA DATA

(71) Applicant: QUALCOMM Incorporated, San Diego, CA (US)

(72) Inventors: Donald W. Gillies, San Diego, CA (US); Yinian Mao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 13/623,589

(22) Filed: Sep. 20, 2012

(65) Prior Publication Data

US 2013/0103849 A1   Apr. 25, 2013

Related U.S. Application Data

(60) Provisional application No. 61/537,407, filed on Sep. 21, 2011.

(51) Int. Cl.
*G06F 15/16* (2006.01)
*H04N 21/2343* (2011.01)
(Continued)

(52) U.S. Cl.
CPC .... *H04N 21/23439* (2013.01); *H04L 65/1083* (2013.01); *H04L 65/607* (2013.01); *H04L 65/608* (2013.01); *H04L 65/80* (2013.01); *H04N 21/2662* (2013.01); *H04N 21/4424* (2013.01); *H04N 21/44209* (2013.01);
(Continued)

(58) Field of Classification Search
USPC ............................................................. 701/1
See application file for complete search history.

(56) References Cited

U.S. PATENT DOCUMENTS 6,674,719 B1 * 1/2004 LeCorney ...................... 370/235
6,766,365 B1 * 7/2004 Huang et al. .................. 709/223
(Continued)

FOREIGN PATENT DOCUMENTS

CN          1871795         11/2006
EP          2360923 A1       8/2011
(Continued)

OTHER PUBLICATIONS

Bread Broadband for All, "Broadband in Europe for All: A Multi-disciplinary Approach," Project No. FP6-IST-507554, Jan. 2006, 282 pp. (Cited in Written Opinion as: DVB Organization: "tm3502.BREAD-D22-D32.full.pdf", DVB, Digital Video Broadcasting, C/O EBU—17A Ancienne Route—CH-1218 Grand Saconnex, Geneva—Switzerland, Jan. 23, 2006, XP017801571).

(Continued)

*Primary Examiner* — Tauqir Hussain
*Assistant Examiner* — Kamran Mohammadi
(74) *Attorney, Agent, or Firm* — Shumaker & Sieffert, P.A.

(57) ABSTRACT

Video data is retrieved from a server. During retrieval of the video data, a client device receives information indicating bit rates of representations of multimedia content. In addition, the client device receives information indicating priority values for segments of the representations. The segments correspond to particular temporal sections of the representations. The client device requests selected ones of the segments based on the priority values for the segments and an estimated throughput. In some instances, the client device requests the segments in accordance with an adaptive streaming network protocol, such as Dynamic Adaptive Streaming over HTTP (DASH).

46 Claims, 9 Drawing Sheets

(51) Int. Cl.
  *H04N 21/845* (2011.01)
  *H04L 29/06* (2006.01)
  *H04N 21/2662* (2011.01)
  *H04N 21/442* (2011.01)
  *H04N 21/6332* (2011.01)
  *H04N 21/643* (2011.01)

(52) U.S. Cl.
  CPC ... *H04N 21/6332* (2013.01); *H04N 21/64322* (2013.01); *H04N 21/8456* (2013.01); *H04N 21/234327* (2013.01)

(56) References Cited

U.S. PATENT DOCUMENTS

| | | | |
|---|---|---|---|
| 7,864,808 | B2 | 1/2011 | Krause |
| 2003/0177324 | A1* | 9/2003 | Timpanaro-Perrotta G06F 11/1448 711/162 |
| 2003/0195977 | A1* | 10/2003 | Liu et al. ............ 709/231 |
| 2003/0233464 | A1 | 12/2003 | Walpole et al. |
| 2003/0236904 | A1* | 12/2003 | Walpole et al. ........... 709/231 |
| 2004/0098748 | A1 | 5/2004 | Bo et al. |
| 2004/0172478 | A1* | 9/2004 | Jacobs et al. ............ 709/233 |
| 2005/0076136 | A1* | 4/2005 | Cho .............. H04L 29/06027 709/231 |
| 2005/0120368 | A1* | 6/2005 | Goronzy et al. ............ 725/28 |
| 2005/0183118 | A1* | 8/2005 | Wee et al. ............ 725/46 |
| 2006/0114990 | A1 | 6/2006 | Pak |
| 2007/0060178 | A1 | 3/2007 | Gorokhov et al. |
| 2008/0052414 | A1* | 2/2008 | Panigrahi et al. ........... 709/246 |
| 2008/0114894 | A1* | 5/2008 | Deshpande ............ 709/237 |
| 2008/0165861 | A1 | 7/2008 | Wen et al. |
| 2008/0195745 | A1* | 8/2008 | Bowra et al. ............ 709/231 |
| 2009/0282162 | A1* | 11/2009 | Mehrotra .......... H04L 65/608 709/233 |
| 2009/0292819 | A1* | 11/2009 | Kandekar et al. ........... 709/231 |
| 2009/0300203 | A1* | 12/2009 | Virdi et al. .......... 709/231 |
| 2009/0300204 | A1* | 12/2009 | Zhang ............ H04N 21/2358 709/231 |
| 2010/0095300 | A1* | 4/2010 | West ............ G06F 9/5016 718/104 |
| 2010/0121974 | A1* | 5/2010 | Einarsson et al. ........... 709/231 |
| 2010/0260254 | A1 | 10/2010 | Kimmich et al. |
| 2011/0035507 | A1* | 2/2011 | Brueck et al. ............ 709/231 |
| 2011/0082914 | A1* | 4/2011 | Robert et al. ............ 709/219 |
| 2011/0093605 | A1* | 4/2011 | Choudhury et al. ........ 709/231 |
| 2011/0093617 | A1 | 4/2011 | Igarashi |
| 2011/0161485 | A1* | 6/2011 | George et al. ............ 709/224 |
| 2011/0238789 | A1* | 9/2011 | Luby et al. ............ 709/219 |
| 2011/0296046 | A1* | 12/2011 | Arya et al. ............ 709/231 |
| 2012/0005364 | A1* | 1/2012 | Ma et al. ............ 709/231 |
| 2012/0011191 | A2* | 1/2012 | Kaspar ............ H04W 76/025 709/203 |
| 2012/0023155 | A1* | 1/2012 | Myers et al. ............ 709/203 |
| 2012/0084454 | A1* | 4/2012 | Lindquist .......... H04N 7/17318 709/231 |
| 2012/0143994 | A1* | 6/2012 | Calcev .............. G06F 17/30817 709/219 |
| 2012/0317305 | A1* | 12/2012 | Einarsson .......... H04L 65/4084 709/231 |
| 2013/0173760 | A1* | 7/2013 | Yie ............ H04N 21/8456 709/219 |
| 2013/0332559 | A1* | 12/2013 | Mas Ivars .......... H04L 61/1511 709/216 |
| 2014/0325020 | A1 | 10/2014 | Igarashi |

FOREIGN PATENT DOCUMENTS

| | | |
|---|---|---|
| JP | 2005267218 A | 9/2005 |
| JP | 2007158414 A | 6/2007 |
| JP | 2011087103 A | 4/2011 |
| WO | 2007024936 A2 | 3/2007 |
| WO | 2011102791 A1 | 8/2011 |

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Fernando et al: "DASH Evaluation Experiment #4: Delivery Format Addressing", Oct. 28, 2010, MPEG meeting; Guangzhou; (Motion Picture Expert Group or ISO/IEC JTC1/SC29/WG11), No. M18012, XP030046602, 27 pp.

International Search Report and Written Opinion—PCT/US2012/056568—ISA/EPO—Apr. 16, 2013, 10 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

International Preliminary Report on Patentability—PCT/US2012/056568—The International Bureau of WIPO Geneva Switzerland Jan. 17, 2014, 6 pp.

Second Written Opinion from International Application No. PCT/US2012/056568, dated Oct. 16, 2013, 4 pp.

Qiu et al., "Optimizing HTTP-based adaptive video streaming for wireless access networks", IEEE International Conference on Broadband Network and Multimedia Technology, Oct. 26-28, 2010, 8 pp.

Sanchez et al., "iDASH: Improved Dynamic Adaptive Streaming over HTTP using Scalable Video Coding", MMSys '11, Proceedings of the second annual ACM conference on Multimedia systems, Feb. 23-25, 2011, 8 pp.

* cited by examiner

SIGNALING CHARACTERISTICS OF SEGMENTS FOR NETWORK STREAMING OF MEDIA DATA

This application claims the benefit of U.S. Provisional Patent Application No. 61/537,407, filed Sep. 21, 2011, the entire content of which is hereby incorporated by reference.

TECHNICAL FIELD

This disclosure relates to network streaming of media data.

BACKGROUND

Many technologies have been developed to stream media data over communication networks. These technologies include Hypertext Transfer Protocol Streaming (HTTP Streaming), such as Dynamic Adaptive Streaming over HTTP (DASH). In DASH, multimedia content is encoded in a variety of different ways, producing different representations of the multimedia content. Each of the representations is divided into a series of segments. The segments contain data representing samples of the multimedia content. For example, each of the segments can represent a different three-second sequence of samples of the multimedia content. Each of the segments may have a different Uniform Resource Locator (URL).

In DASH, a client device receives a manifest file that describes characteristics of the various representations of the multimedia content. The manifest file may contain information indicating the URLs of the segments of the representations. To stream data of the multimedia content from a server device, the client sends requests, e.g., GET or partial GET requests, to the server over time. The requests specify URLs for the segments of particular representations as indicated in the manifest file. As the client device receives the segments from the server device, the client device processes the segments (e.g., decodes and renders coded video data of the segments) to present the samples of the media content represented by the segments.

SUMMARY

In general, the techniques of this disclosure are directed to providing and using information to improve a user experience when streaming data of multimedia content from a server device to a client device over a network. Various representations of the multimedia content are encoded at various bit rates. Higher bit rate representations may offer relatively higher playback quality while lower bit rate representations may offer more efficient bandwidth utilization. A content preparation device forms the representations. In addition, the content preparation device may generate priority values that signal priorities for segments of the multimedia content. In some examples, the priority value for a particular segment indicates whether the client device should request data for the segment from a relatively higher or lower bit rate representation. In this manner, the client device may obtain the information describing the priorities of the various representations and determine representations from which to retrieve segments of the multimedia content based on the priorities.

In one example, this disclosure describes a method for processing video data. The method comprises determining an estimated throughput. The method also comprises selecting, based at least in part on the estimated throughput and priority values for segments of representations of multimedia content, one or more of the segments. The representations include video data that are encoded at different bit rates, each of the segments are retrievable individually, and the segments correspond to particular temporal sections of the representations. The method also comprises processing the one or more selected segments.

In another example, this disclosure describes a computing device that comprises one or more processors configured to determine an estimated throughput. The one or more processors are configured to select, based at least in part on the estimated throughput and priority values for segments of representations of multimedia content, one or more of the segments. The representations include video data are encoded at different bit rates, each of the segments are retrievable individually, and the segments correspond to particular temporal sections of the representations. The one or more processors are also configured to process the one or more selected segments.

In yet another example, this disclosure describes a computing device that comprises means for determining an estimated throughput. The computing device also comprises means for selecting, based at least in part on the estimated throughput and priority values for segments of representations of multimedia content, one or more of the segments. The representations include video data are encoded at different bit rates, each of the segments are retrievable individually, and the segments correspond to particular temporal sections of the representations. In addition, the computing device comprises means for processing the one or more selected segments.

In yet another example, this disclosure describes a computer-readable storage medium having stored thereon instructions that, when executed, cause a processor to determine an estimated throughput. The instruction also cause the processor to select, based at least in part on the estimated throughput and priority values for segments of representations of multimedia content, one or more of the segments. The representations include video data are encoded at different bit rates, each of the segments are retrievable individually, and the segments correspond to particular temporal sections of the representations. The instructions also cause the processor to process the one or more selected segments.

In yet another example, this disclosure describes a method for providing video data via an adaptive streaming network protocol. The method comprises sending information that indicates priority values for segments. Each of the segments is retrievable individually. The segments correspond to particular temporal sections of representations of multimedia content. Each of the representations of the multimedia content includes video data encoded at a different bit rate. In addition, the method comprises sending requested segments via the adaptive streaming network protocol in response to one or more requests from a client device, the requested segments being ones of the segments specified by the requests.

In yet another example, this disclosure describes a computing device that comprises one or more processors configured to send information that indicates priority values for segments. Each of the segments is retrievable individually. The segments correspond to particular temporal sections of representations of multimedia content. Each of the representations of the multimedia content includes video data encoded at a different bit rate. The one or more processors are also configured to send requested segments via the adaptive streaming network protocol in response to one or more requests from a client device. The requested segments are ones of the segments specified by the requests.

In yet another example, this disclosure describes a computing device comprising means for sending information that indicates priority values for segments. Each of the segments is retrievable individually. The segments correspond to particular temporal sections of representations of multimedia content. Each of the representations of the multimedia content includes video data encoded at a different bit rate. The computing device also comprises means for sending requested segments via the adaptive streaming network protocol in response to one or more requests from a client device. The requested segments are ones of the segments specified by the requests.

In yet another example, this disclosure describes a computer-readable storage medium having stored thereon instructions that, when executed, cause a processor to send information that indicates priority values for segments. Each of the segments is retrievable individually. The segments correspond to particular temporal sections of representations of multimedia content. Each of the representations of the multimedia content includes video data encoded at a different bit rate. Execution of the instructions also causes the computing device to send requested segments via the adaptive streaming network protocol in response to one or more requests from a client device. The requested segments are ones of the segments specified by the requests.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
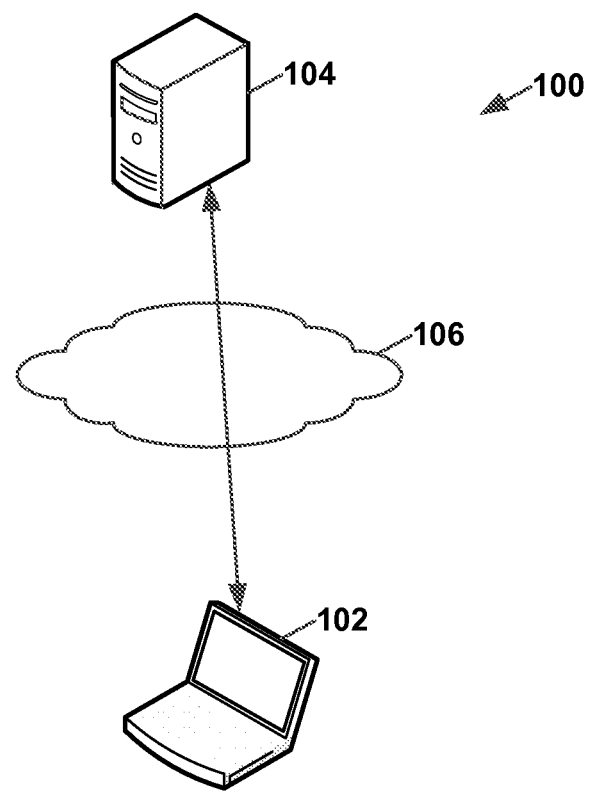
FIG. 1 is a conceptual diagram that illustrates an example system in which a client device communicates with a server device over a network to present media content to a user.

In general, the techniques of this disclosure are directed to providing and using information to improve a user experience when streaming data of multimedia content over a network. Devices of a content delivery system may assemble various representations of the multimedia content to provide for various decoding and rendering capabilities of client devices. For example, a content preparation device may produce representations for devices having various screen sizes, two-dimensional, three-dimensional, or multi-view playback, frame rates, various languages for closed captioning or other text presented on the screen, decoders conforming to various profiles and/or levels of various standards, or other characteristics. Moreover, the content preparation device may encode a set of representations with similar coding and rendering properties at various bit rates, to accommodate fluctuations in network bandwidth availability. In this manner, a client device may determine a set of representations appropriate for the decoding and rendering capabilities of the client device, determine an available amount of network bandwidth, and request data from one of the representations in the determined set.

In accordance with the techniques of this disclosure, the content preparation device may provide hint information to the client device in the form of priority values for various temporal sections of the multimedia content. For example, the content preparation device may provide priority values for each segment of each representation, or for temporal sections (e.g., sub-segments) of the multimedia content. The priority values may generally indicate a relative importance of higher quality video data for a particular temporal section of the multimedia content. Additionally or alternatively, the priority values may indicate a relative amount of quality difference between selecting a segment from a high bit rate representation and a segment from a low bit rate representation.

The client device may be configured to analyze the priority values, in addition to determining an amount of available bandwidth, when determining representations from which to request segments for particular temporal sections of the multimedia content. In this manner, the client device may be configured to provide a user with a more satisfying user experience. For example, the client device may determine an amount of available network bandwidth for a plurality of upcoming segments. Rather than requesting data from the highest bit rate representation that can be satisfied by the bandwidth determined to be available over the upcoming segments, the client device can be configured to request segments having a relatively low priority from lower-bit rate representations, and to request segments having a relatively high priority from higher-bit rate representations. In this manner, the client device may receive relatively higher-quality video data than would otherwise be received for high-priority temporal sections, and may receive data that is more bit rate-efficient for low-priority temporal sections.

The attached drawings illustrate examples of the techniques described in this disclosure. Elements indicated by reference numbers in the attached drawings correspond to elements indicated by like reference numbers in the following description. In the attached drawings, ellipses indicate the presence of one or more elements similar to those separated by the ellipses. Furthermore, stacked elements in the attached drawings indicate the presence of one or more similar elements. Alphabetical suffixes on reference numbers for similar elements are not intended to indicate the presence of particular numbers of the elements. In this disclosure, elements having names that start with ordinal words (e.g., "first," "second," "third," and so) do not necessarily imply that the elements have a particular order. Rather, such ordinal words are merely used to refer to similar elements.

FIG. 1 is a conceptual diagram that illustrates an example system 100 in which a client 102 communicates with a server device 104 over a network 106 to present data of media content to a user. Client device 102 and server device 104 respectively comprise one or more computing devices. Client device 102 and server device 104 can comprise various types of computing devices. For example, FIG. 1 illustrates client device 102 as a laptop computer. In other examples, client device 102 can include a desktop computer, a tablet computer, a smartphone, a television set top box, an in-car computer, a video game console, a personal media player, or another type of computing device. Furthermore, the example of FIG. 1 illustrates server device 104 as a standalone server device. In other examples, server device 104 can comprise one or more blade server devices, desktop computers, mainframe computers, and/or other types of computing devices.

Network 106 may facilitate communication between client device 102 and server device 104. Network 106 may comprise a set of computing devices and communication links between the computing devices. Network 106 can include various types of computing devices. For example, network 106 can include routers, bridges, cache systems, content delivery systems, firewall devices, hubs, and other types of intermediate network devices. In some examples, network 106 comprises the Internet. Furthermore, in some examples, network 106 comprises a local area network.

Network 106 may transmit data between client device 102 and server device 104 at a given bandwidth. For example, network 106 may be able to transmit data from server device 104 to client device 102 at a bandwidth of seven megabits per second (Mbps). The given bandwidth may change in some circumstances. For example, if network 106 becomes congested due to high traffic levels, the rate at which network 106 is able to transmit data from server device 104 to client device 102 may drop from seven Mbps to five Mbps. In this example, the rate at which network 106 is able to transmit data from server device 104 to client device 102 may later increase from five Mbps to eight Mbps, and so on.

A user can use client device 102 for various purposes. For example, the user can use client device 102 for work, home use, recreation, or other purposes. The user may elect to view multimedia content (also referred to generally as media content) while using client device 102. For example, the user may interact with a web browser application or other application executed by client device 102 to request to view multimedia content. In this example, the multimedia content may be stored by server device 104. As an example, the user may elect to view the media content by selecting a hyperlink of the multimedia content. The multimedia content may include continuous media. Continuous media may be media that has an inherent notion of time. For example, the media content may include a video stream, an audio stream, a speech stream, or another type of media.

The media content may comprise a temporal sequence. As defined in the DASH standard, the temporal sequence can include one or more periods. Each of the periods is a temporal section of the media content. In various examples, the temporal sections of the media content have various temporal lengths. For example, a period of the media content may correspond to a temporal length between ten and sixty seconds long.

Server 104 may store multiple representations of each of the periods. Each of the representations may have particular characteristics, such as accommodating various coding and/or rendering capabilities of client devices and coding at various bit rates. Server device 104 may store a set of representations having common coding and rendering characteristics, but different bit rates, where such a set of representations may form an adaptation set. Representations of an adaptation set may be coded at various bit rates. For example, a first representation of a period of the media content may be coded at a bit rate of 3.0 Mbps. In this example, a second representation of the period may be coded at a bit rate of 1.5 Mbps. In this example, a third representation of the period may be coded at a bit rate of 500 kilobits per second (Kbps).

Each of the representations is divided into one or more segments. Each of the segments of a representation corresponds to a different temporal section of the representation. In various examples, the segments can correspond to temporal sections having various temporal lengths. For example, each of the segments of a representation can correspond to a temporal section of the representation having playback durations of approximately two seconds. In other examples, segments and periods can have shorter or longer temporal playback durations.

Each of the segments may include data representing a sequence of coded samples of the media content. The temporal section that corresponds to a segment includes the sequence of coded samples represented by the segment. For example, each of the segments can represent a sequence of frames, slices, groups of pictures, or other coded units of video data. In this example, if the frames of the video are indexed according to frame number values starting from 0, a first segment of the video can represent frame numbers 0 through 74, a second segment of the video can represent frame numbers 75 through 149, a third segment of the video can represent frame numbers 150 through 224, and so on. In another example, if the media content includes an audio stream, each of the segments can represent a sequence of audio samples. Client device 102 can use the data in a segment to play back the sequence of samples represented by the segment.

In examples where the media content includes video data, each of the segments can be included in a sequence of coded network abstraction layer (NAL) units. The NAL units form video frames when decoded. Each of the frames can comprise a still image. When client device 102 presents the video to a user, client device 102 displays the frames to the user in rapid succession (e.g., twenty-five frames per second (fps)). When client device 102 displays the frames in rapid succession, the user may perceive objects in the frames to be in motion. In examples where the media content includes an audio stream, the media content may include a sequence of audio samples. When client device 102 presents the audio stream, client device 102 may convert the audio samples into sound waves.

In accordance with the techniques of DASH, segments of a period of multimedia content may be, but are not necessarily, temporally aligned. When segments are temporally aligned within a period, each of the representations for the period may include segments corresponding to the same temporal sections within the period. That is, when the segments are temporally aligned, the n-th segment of each representation for the period may correspond to the same temporal section. The segments of different representations may be temporally aligned. For example, the media content may include a segment alignment flag that indicates whether, for two representations X and Y, the m-th segment of X can overlap the n-th segment of Y, when m is not equal to n.

For ease of explanation, this disclosure uses the term "segment group" to refer to segments that represent the same temporal section of the media content. Segments that correspond to different temporal sections of the media content are in different segment groups. That is, a segment group may include the n-th segment of each representation of a period of multimedia content when segments of the period are temporally aligned.

In accordance with the techniques of this disclosure, each of the segments, segment groups, or temporal sections of the media content is associated with a priority value. Server device 104 may assign priority values to the segments, segment groups, or temporal sections of the media content. Server device 104 may provide a data structure, such as a manifest file, segment index box, or another metadata box in the coded media stream, that includes information indicative of the priority values for the segments or segment groups. In various examples, the segments are associated with priority values in various ways. For example, separate priority values can be assigned to each segment of each representation. In another example, separate priority values can be assigned to each segment group or temporal section of the media content. In this example, each of the segments in a given segment group (i.e., each of the segments that represent a given temporal section in the media content) may be associated with the same priority value.

The priority values may generally indicate relative importance of retrieving a high-quality version of data of the media content at a particular temporal section. For example, a high priority value may indicate that, for a corresponding temporal section, client device 102 should attempt to retrieve a relatively high quality version (e.g., a segment from a relatively high bit rate representation) of data for the temporal section. As another example, a low priority value may indicate that, for a corresponding temporal section, client device 102 would not experience much degradation to user experience by retrieving a lower quality, albeit more bandwidth-efficient, version of data for the temporal section. In this manner, the priority values may provide information that client device 102 may use to select segments from representations of the media content in situations where there is enough available bandwidth to retrieve at least some segments from relatively higher bit rate representations, but not enough available bandwidth to retrieve all segments from the highest bit rate representation.

Client device 102 may receive information indicating the priority values associated with the segments, e.g., by retrieving the manifest file for the media content. In addition, client device 102 may receive information indicating bit rates of the segments, e.g., by retrieving the manifest file for the media content. Subsequently, client device 102 may perform a selection operation that selects segments for each segment group in each period of the media content. During the selection operation, client device 102 may estimate the bandwidth at which client device 102 is able to receive segments from server 104. Furthermore, during the selection operation, client device 102 may select segments based on the estimated bandwidth and the priority values associated for the segments and/or segment groups. In some examples, client device 102 may select segments based on the estimated bandwidth, the priority values associated with the segments, and additionally a current playback duration of video data in a playback buffer. For example, client device 102 may select a segment combination for an upcoming time period. In this example, the segment combination may include one segment from each segment group in the upcoming time period. In this example, client device 102 may select the segments in the segment combination such that a cumulative bit rate of the selected segments is not substantially greater than the estimated bandwidth. In another example, client device 102 may select the segments in the segment combination such that an estimated transfer time for the selected segments is less than or equal to a playback duration of the selected segments plus the current playback duration of video data in the playback buffer. In this example, the estimated transfer time for the selected segments may be based on a total number of bits in the selected segments and the estimated bandwidth or other estimated throughput. Furthermore, in this example, client device 102 may select the segments based on the priority values of the segments in the segment groups of the upcoming time period. The estimated bandwidth may be an estimate of the bandwidth at which server device 104 is able to provide data to client device 102.

By selecting the segments based on the estimated bandwidth, the priority values, and, in some examples, the current playback duration of video data in the playback buffer, client device 102 may be able to select the segments that provide an improved user experience, given the estimated bandwidth, relative to simply selecting only one representation based only on the bit rate for the representation compared to the available bandwidth. As described elsewhere in this disclosure, client device 102 can select the segments using the priority values and can generate the estimated bandwidth in various ways.

Client device 102 may request the selected segments in accordance with an adaptive streaming network protocol. An adaptive streaming network protocol may allow for adaptively changing the bit rates of selected segments. In various examples, client device 102 may request the selected segments in various ways. For example, client device 102 can request the selected segments by sending segment request messages to server device 104. The segment request messages may comprise GET or partial GET requests as specified in HTTP/1.1 (RFC 2616). Client device 102 may retrieve a whole file associated with a given uniform resource locator (URL) or uniform resource name (URN) using a GET request. A partial GET request may resemble a GET request, except that the client device may specify a byte range as an input parameter to the GET request to retrieve a continuous number of bytes of a file corresponding to the byte range specified in the partial GET request, of the file specified by the request. Thus, movie fragments may be provided for network streaming, because client device 102 may submit a partial GET request to retrieve one or more individual movie fragments of a segment.

When client device 102 requests the selected segments, server device 104 may send copies of the selected segments to client device 102. When client device 102 receives a copy of a segment, client device 102 may decode and render the copy of the segment to generate the samples represented by the segment. Client device 102 can then output the samples. For instance, if the media content includes an audio stream, client device 102 can output the samples by converting the samples into a sound wave. Likewise, if the media content includes video data, client device 102 may output the samples as reconstructed pictures at a particular frame rate. In this way, by sending segment request messages and processing the segments received in response to the segment request messages, client device 102 may retrieve data of the media content from server device 104. Furthermore, by sending the segment request messages periodically over time, client device 102 may stream data of the media content from server device 104.

Accordingly, the techniques of this disclosure may be applicable to network streaming protocols, such as HTTP streaming, e.g., in accordance with dynamic adaptive streaming over HTTP (DASH). In the example of streaming media data using DASH, there may be multiple representations for video and/or audio data of multimedia content. The manifest of such representations may be defined in a Media Presentation Description (MPD) data structure. A media presentation may correspond to a structured collection of data that is accessible to an HTTP streaming client device, such as client device 102. The HTTP streaming client device may request and download media data information to present a streaming service to a user of the client device. A media presentation may be described in the MPD data structure, which may include updates of the MPD.

Media content may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media content in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bit rate, resolution, and/or codec for video data and bit rate, language, and/or codec for audio data. The term representation may be used to refer to a section of encoded audio or video data corresponding to a particular period of the multimedia content and encoded in a particular way.

Representations of a particular period may be assigned to a group indicated by a group attribute in the MPD. Representations in the same group are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a URL, URN, or uniform resource identifier (URI). The MPD may provide the identifiers for each segment. In some examples, the MPD may also provide byte ranges in the form of a range attribute, which may correspond to the data for a segment within a file accessible by the URL, URN, or URI.

In the example of H.264/AVC (Advanced Video Coding), coded video samples are organized into network abstraction layer (NAL) units, which provide a "network-friendly" video representation addressing applications such as video telephony, storage, broadcast, or streaming. NAL units can be categorized into Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and supplemental enhancement information (SEI) NAL units, among others. Parameter sets may contain sequence-level header information (in sequence parameter sets (SPS)) and picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

SEI NAL units may contain SEI messages. SEI messages may include information that is not necessary for decoding the coded pictures from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

Each representation may include one or more media components, where each media component may correspond to an encoded version of one individual media type, such as audio, video, or timed text (e.g., for closed captioning). Media components may be time-continuous across boundaries of consecutive media segments within one representation.

As with many video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it may still be possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile. Accordingly, various representations of media content may be provided to account for various profiles and levels of a video coding standard supported by decoders of various devices.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks (also referred to as "blocks" or "MBs") that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream, such as a particular representation of multimedia content.

Figure 2:
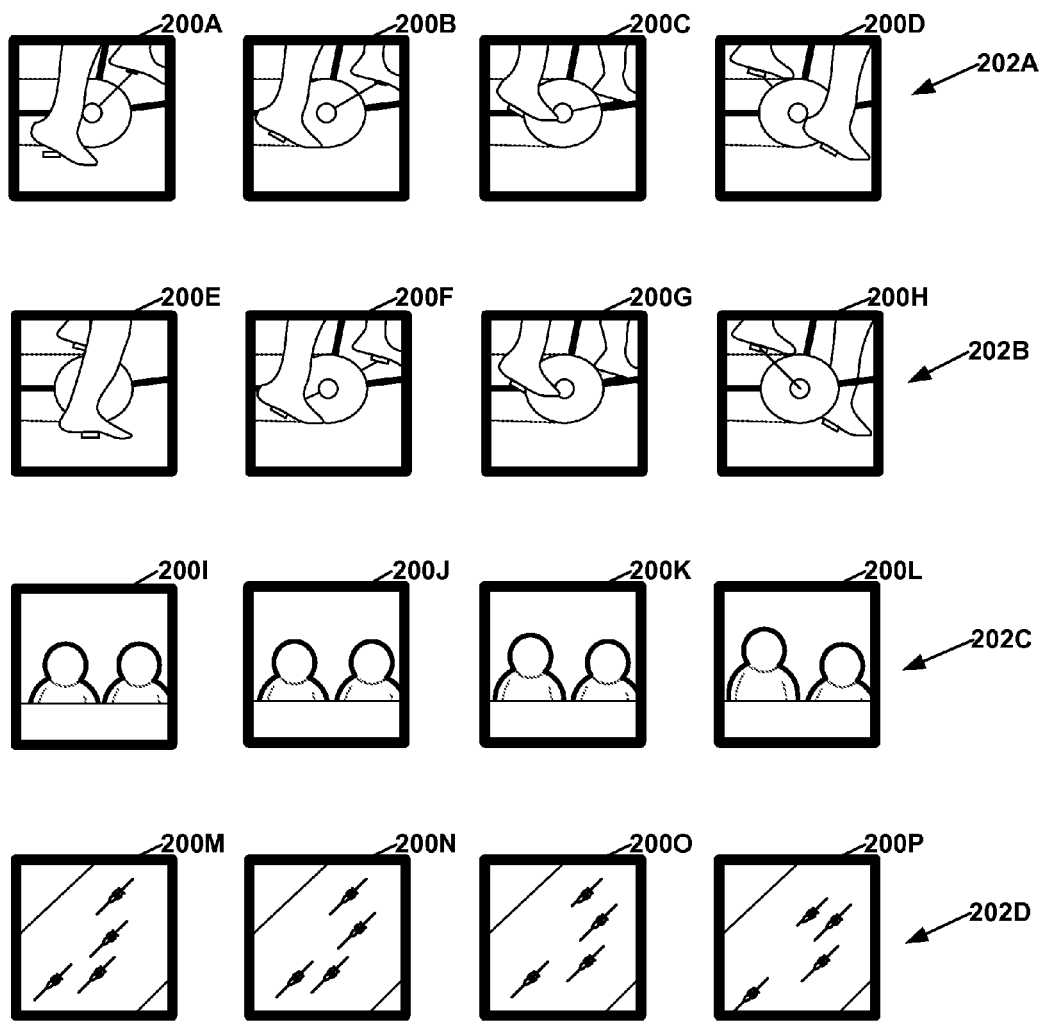
FIG. 2 is a conceptual diagram that illustrates an example video comprising frames.

FIG. 2 is a conceptual diagram that illustrates an example video comprising frames 200A through 200P (collectively, "frames 200"). Each of frames 200 comprises a still image in this example. When client device 102 presents frames 200 in succession, a user may perceive the objects in frames 200 to be in motion.

Frames 200 belong to sample sequences 202A through 202D (collectively, "sample sequences 202"). Each of sample sequences 202 is illustrated as a separate row in the example of FIG. 2. Each of sample sequences 202 may correspond to a respective temporal section of multimedia content. Each representation of the video may include a segment that represents sample sequence 202A, a segment that represents sample sequence 202B, a segment that represents sample sequence 202C, and a segment that represents sample sequence 202D. In the example of FIG. 2, sample sequences 202 each include four frames. Readers will understand that the sample sequences of the video can include more or less than four frames.

Different segments of a video can include different types of scenes. For instance, in the example of FIG. 2, the video shows a bicycle race. Sample sequences 202A and 202B include scenes of a person pedaling a bicycle. Sample sequence 202C includes a scene of commentators sitting at a desk describing the race. Sample sequence 202D includes a scene of the race as seen from a helicopter hovering over the race.

In some types of scenes, each frame changes little from the preceding frame. For ease of explanation, this disclosure may refer to such scenes as low-action scenes. In other types of scenes, each frame is significantly different from the preceding frame. For ease of explanation, this disclosure may refer to such scenes as high-action scenes. In the example of FIG. 2, sample sequence 202C represents a low-action scene containing the relatively still images of the commentators talking. Consequently, each frame in sample sequence 202C changes little from the preceding frame. In contrast, sample sequences 202A and 202B contain high-action scenes showing the fast-paced motion of a person pedaling a bicycle. Consequently, each frame in sample sequences 202A and 202B changes significantly from the preceding frame.

The segments include data encoded using an encoding format. For example, if the media content is a video, segments can include data encoded using the H.264/AVC format, the VC-2 format, the MPEG-4 Part 2 format, the H.263 format, or another video coding format. In such encoding formats, a greater number of bits may be required to represent the frames in high-action scenes at a given maximum distortion level than may be required to represent the frames in low-action scenes at the same given maximum distortion level. In other words, a higher bit rate may be required to present high-action scenes at the maximum distortion level while a lower bit rate may be sufficient to present low-action scenes at the same maximum distortion level. For example, a higher bit rate may be required to represent the high-action scenes in sample sequences 202A and 202B at a given maximum distortion level, while lower bit rates may be sufficient to represent the low-action scenes in sample sequences 202C and 202D at the given maximum distortion level.

In examples where the media content is an audio stream, the segments can represent samples encoded using the MP3 format, the Vorbis format, Advanced Audio Coding (AAC), Windows Media Audio (WMA), Digital Speech Standard (DSS), or another audio coding format. In such encoding formats, a greater number of bits may be required to represent series of samples that represent many frequencies than may be required to represent series of samples that represent fewer frequencies.

The estimated bandwidth can represent an upper limit on how much data server device 104 can transfer to client device 102. Consequently, the bandwidth might not be great enough to transfer only segments having the highest bit rate without causing an interruption in playback. For example, each of the segments in a given representation can correspond to a temporal section of the media content lasting three seconds and can have a bit rate of 3.0 Mbps. In this example, the upcoming time period can include four segment groups. Hence, in this example, the upcoming time period lasts twelve seconds. If the estimated bandwidth is 1.75 Mbps, 21.0 megabits can be transferred to client device 102 during these twelve seconds. In contrast, 36.0 megabits would be transferred if four segments having bit rates of 3.0 Mbps were transferred.

As discussed above, higher bit rates may be required to represent high-action scenes than low-action scenes at the same maximum distortion level. Because only a limited amount of data can be transferred during the time associated with the upcoming time period, client device 102 can use the estimated bandwidth and the priority values for the segments to select segments to include in the combination. The combination can include some segments having high bit rates and some segments having lower bit rates. Client device 102 can use the priority values associated with the segments to choose a combination in which segments representing high-action scenes have higher bit rates and in which segments representing low-action scenes have lower bit rates. In this way, an overall distortion level of frames represented by segments in the combination can be reduced.

For example, client device 102 can select a combination of segments in the upcoming time period's segment groups such that the average bit rates of the segments of the combination is less than or equal to the estimated bandwidth. In another example, client device 102 also select a combination of segments based at least in part on the playback duration of video data currently in a playback buffer. In this example, client device 102 can select a combination of segments in the upcoming time period's segment groups such that an estimated transfer time for the selected segments is less than or equal to a playback duration of the selected segments plus a playback duration of video data in a playback buffer.

In some examples, client device 102 can increase the length of the playback buffer in response to particular circumstances. For instance, client device 102 may increase the length of the playback buffer at the beginning of a video to help ensure high quality playback when client device 102 starts playing back the video. In some such examples, server device 104 may include data in a bitstream to instruct client device 102 to increase the playback buffer. Increasing the length of the buffer at the beginning of a video may be especially advantageous for videos that start with high-action scenes.

Figure 3:
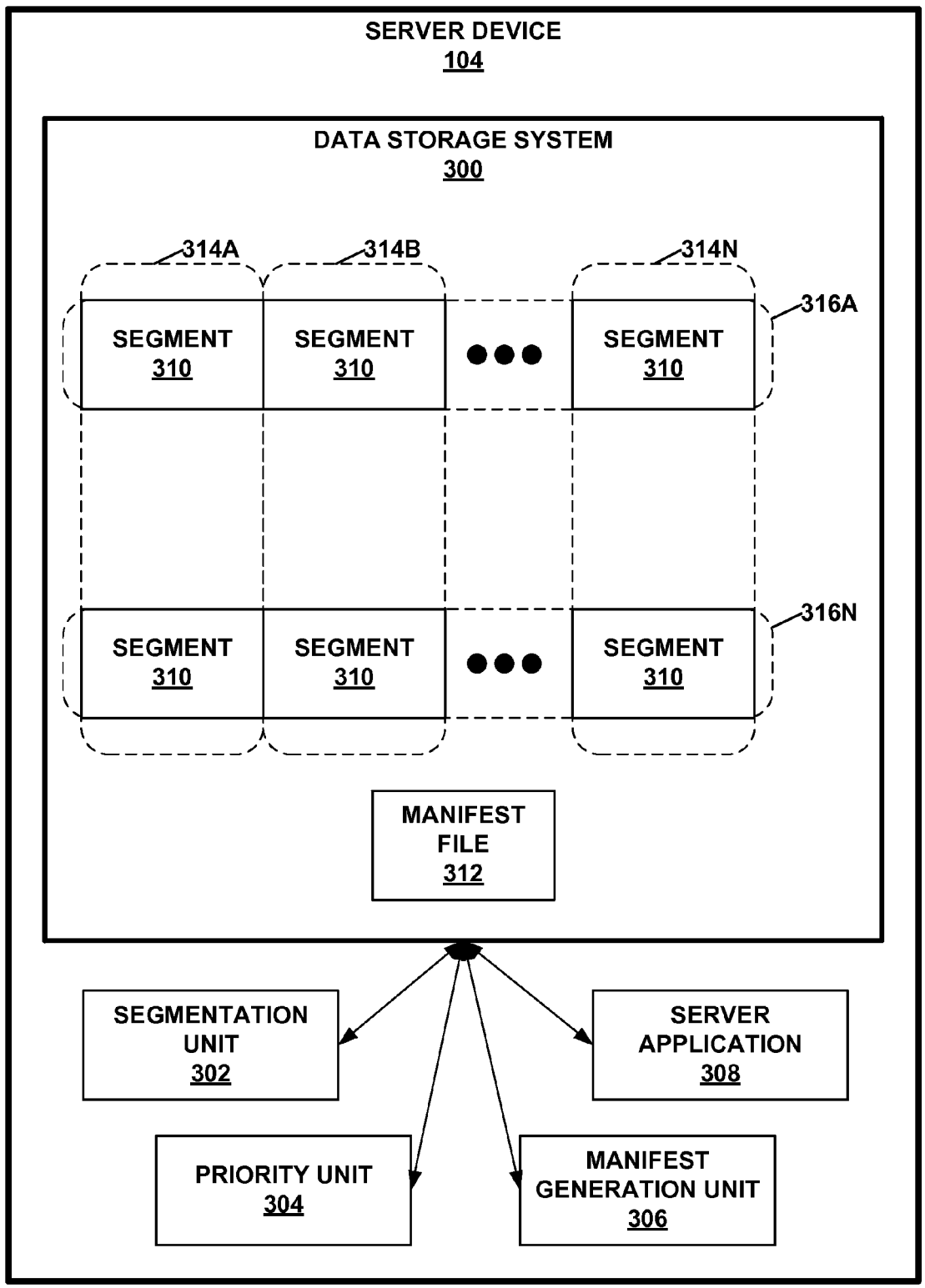
FIG. 3 is a block diagram illustrating an example configuration of the server device.

FIG. 3 is a block diagram that illustrates an example configuration of server device 104. As illustrated in the example of FIG. 3, server device 104 may comprise a data storage system 300, a segmentation unit 302, a priority unit 304, a manifest generation unit 306, and a server application 308. In some other examples, server device 104 may provide systems in addition to those illustrated in the example of FIG. 3. In other examples, server device 104 does not provide each of the systems illustrated in the example of FIG. 3. For example, server device 104 may not provide segmentation unit 302, priority unit 304 or manifest generation unit 306, but may instead receive generated segments of multimedia content, a manifest file for the multimedia content, and priority values from a content preparation device or a content preparation system external to server device 104.

As illustrated in the example of FIG. 3, data storage system 300 may store a plurality of segments 310 and a manifest file 312. In some examples, data storage system 300 may store segments 310 and manifest file 312 in a Third Generation Partnership Project (3GPP) file format. In other examples, data storage system 300 may store segments 310 and manifest file 312 in other ways.

Data storage system 300 may comprise one or more computer storage media that store data, such as segments 310 and manifest file 312. Although this disclosure may refer to manifest file 312 as a "file," some examples do not store manifest file 312 as a file. For instance, in some examples, manifest generation unit 308 dynamically generates data of manifest file 312. In other examples, various periods of multimedia content may be associated with different manifest file data, which may be pre-generated, dynamically generated, or indicated in the form of relevant updates to the previous version of the manifest file. In some instances, manifest file 312 is a Media Presentation Description (MPD) file.

In the example of FIG. 3, data storage system 300 is physically located within a housing of server device 104. In other examples, data storage system 300 is partially or completely outside a housing of server device 104. For example, data storage system 300 may be part of a Network-Attached Storage (NAS) system or a Direct Attached Storage (DAS) system.

Segmentation unit 302 may generate segments 310. As described in detail elsewhere in this disclosure, various examples of segmentation unit 302 may generate segments 310 in various ways. Priority unit 304 may associate priority values with segments 310. As described in detail elsewhere in this disclosure, various examples of priority unit 304 may associate priority values with segments 310 in various ways. Manifest generation unit 306 may generate manifest file 312. As described in detail elsewhere in this disclosure, various examples of manifest generation unit 306 may generate manifest file 312 in various ways. Server application 308 may respond to requests received from client devices, such as client device 102. As described in detail elsewhere in this disclosure, various examples of server application 308 may respond to requests received from client device 102 in various ways.

Server device 104 can implement segmentation unit 302, priority unit 304, manifest generation unit 306, and server application 308 in various ways. For example, server device 104 can implement segmentation unit 302, priority unit 304, manifest generation unit 306, and/or server application 308 when one or more processing units of the computing devices that implement server device 104 execute certain instructions. In another example, the computing devices that implement server device 104 can comprise one or more ASICs that cause server device 104 to implement segmentation unit 302, priority unit 304, manifest generation unit 306, and/or server application 308.

Each of segments 310 may represent a sequence of samples in the media content. For example, the media content can include video data. In this example, one of segments 310 can represent sample sequence 202A, another one of segments 310 can represent sample sequence 202B, and so on. In another example, the media content can be an audio stream. In this example, one of segment 310 can represent a first series of audio samples, another one of segments 310 can represent a second series of audio samples, and so on.

Segments 310 may belong to a plurality of segment groups 314A through 314N (collectively, "segment groups 314"). Each of segments 310 in one of segment groups 314 may represent the same samples of the media content. For example, if the media content is the video of FIG. 2, each of segments 310 in segment group 314A can represent the frames in sample sequence 202A, each of segments 310 in segment group 314N can represent the frames in sample sequence 202B, and so on.

Segments 310 may belong to a plurality of representations 316A through 316N (collectively, "representations 316"). Each of representations 316 may be associated with a different bit rate. Segments 310 in a given representation may represent samples of the media content at the bit rate associated with the given representation. For example, segments 310 in representation 316A can represent the media content at a bit rate of 3.0 Mbps. In this example, segments 310 in representation 316N can represent the media content at a bit rate of 500 Kbps.

Because each of representations 316 may be associated with a different bit rate, the segments in each of segment groups 314 may have different bit rates. For example, a first segment in segment group 314A can have a bit rate of 3.0 megabits per second (Mbps), a second segment in segment group 314A can have a bit rate of 1.0 Mbps, a third segment in segment group 314A can have a bit rate of 500 kilobits per second (Kbps), and so on.

The bit rate of a segment may indicate how many bits the segment uses to represent a temporal section of the media content presented during a unit of playback time. For example, if a representation of the media content has a frame rate of 25 fps, the bit rate of a segment of the representation can indicate how many bits the segment uses to represent 25 frames.

As described in detail elsewhere in this disclosure, client device 102 may select one segment from each of segment groups 314. For example, a first segment group can include segments A, B, and C; a second segment group can include segments D, E, and F; and a third segment group can include segments G, H, and I. In this example, client device 102 can select the segment B from the first segment group, the segment D from the second segment group, and the segment G from the third segment group.

In some examples, manifest file 312 may include information representative of priority values associated with segments 310. As described in detail elsewhere in this disclosure, client device 102 may receive a copy of manifest file 312. In some examples, client device 102 may use the priority values specified by manifest file 312 and an estimated bandwidth to select one segment from each of segment groups 314.

Alternatively, representations 316 themselves may include information representative of priority values associated with segments 310. For example, a segment index (or "SIDX") box of the representations may provide, in addition to indexes for segments of a corresponding representation that allows for sub-segment switching, priority values for the corresponding segments. In this manner, each of representations 316 may include a segment index box that includes information indicative of priority values for the segments of the representation.

As still another example, priority unit 304 may provide information indicative of priority values in a metadata track that provides hint information corresponding to the priority values. In accordance with the ISO base media file format and extensions thereof (e.g., 3GPP), metadata can be structured as a sequence of file format samples, just like a video track. Such a track may be referred to as a metadata track. Each metadata sample may be structured as a metadata statement. There are various kinds of statements, corresponding to the various questions that might be asked about the corresponding file-format sample or its constituent samples.

Figure 4:
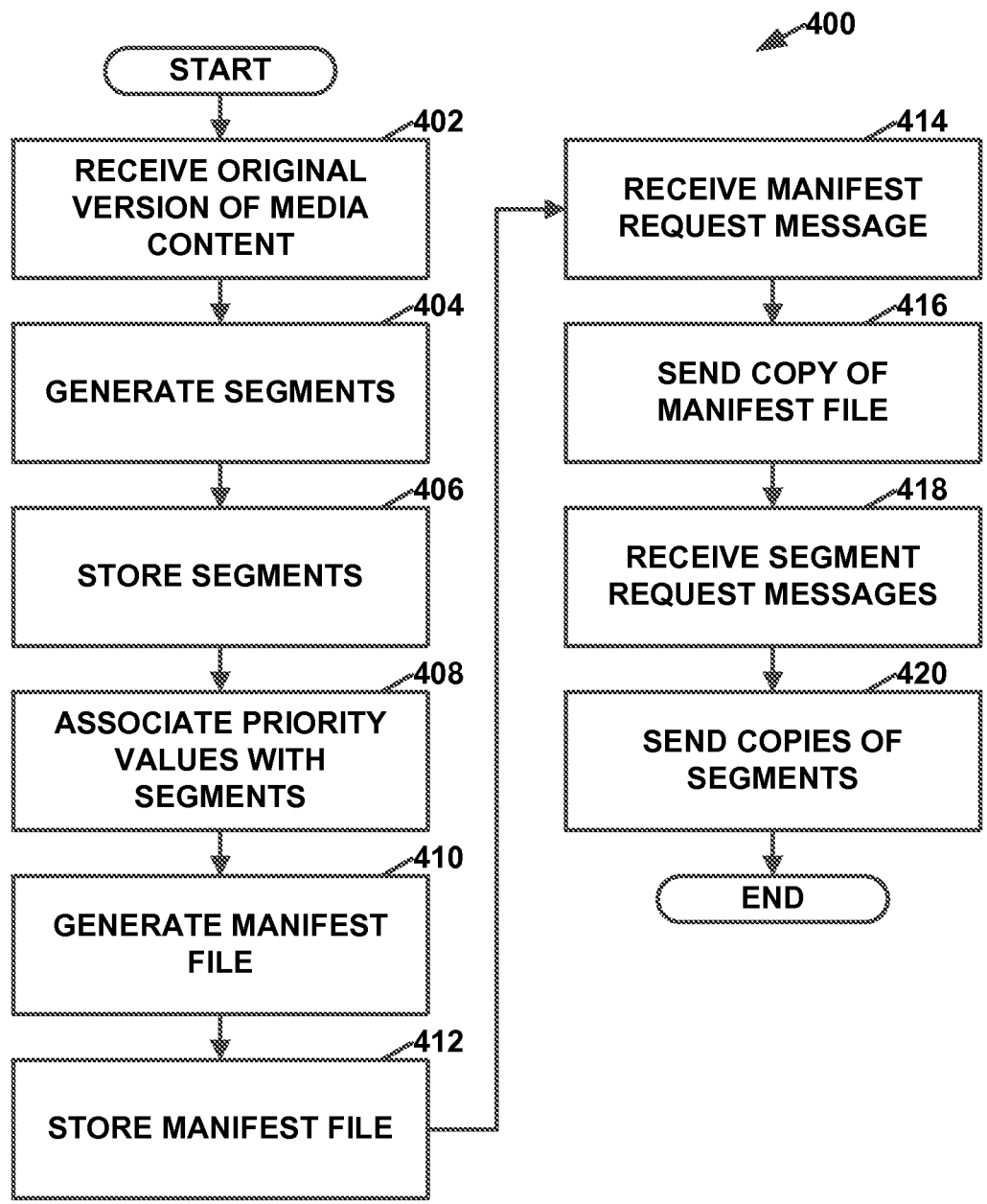
FIG. 4 is a flowchart illustrating an example operation to prepare the media resource for retrieval.

FIG. 4 is a flowchart illustrating an example operation 400 to prepare data of the media content for retrieval. After server device 104 starts operation 400, server device 104 may receive an original version of the media content (402). Server device 104 can receive the original version of the media content in various ways. For example, server device 104 can receive the original version of the media content as raw audio and/or video data from a video camera or microphone connected to server device 104. In another example, an individual can use a computing device to upload the original version of the media content to server device 104. In this example, the original version of the media content can already be encoded in a given format. In yet another example, a media designer can use one or more software applications running on server device 104 to create the original version of the media content. Although described as being performed by server device 104, it should be understood that other devices may also be configured to execute the method of FIG. 4. For example, a content preparation device or a content preparation system may be configured to perform a method that conforms substantially to the method described with respect to FIG. 4.

After receiving the original version of the media content, segmentation unit 302 may generate segments 310 (404). In various examples, segmentation unit 302 can generate segments 310 in various ways. For example, segmentation unit 302 can first divide the original version of the media content into one or more periods. Segmentation unit 302 may then generate multiple sets of NAL units for each of the periods. Each set of NAL units for a period may correspond to a different representation of the period. The NAL units for a period may contain encoded video data that represents frames or other samples within the period. Different sets of NAL units of the period may have different characteristics. For example, the video data in different sets of NAL units can be coded at different bit rates. Then, for each set of NAL units, segmentation unit 302 may generate segments 310 by encapsulating NAL units that contain video data that together represent a sequence of frames or samples in the period. In this way, segmentation unit 302 can generate segments 310 for each of representations 316. In some examples where the original version of the media content comprises raw video or audio data, segmentation unit 302 may generate the encoded video data from the raw video or audio data.

Segmentation unit 302 may generate segments 310 according to a file encapsulation standard, such as the ISO base media file format or the 3GPP file format, which is an extension of the ISO base media file format. The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. ISO Base Media File Format is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual presentations. The file structure may be object-oriented. A file can be decomposed into basic objects very simply and the structure of the objects may be implied from their type.

Files conforming to the ISO base media file format (and extensions thereof) may be formed as a series of objects, called "boxes." Data in the ISO base media file format may be contained in boxes, such that no other data needs to be contained within the file and there need not be data outside of boxes within the file. This includes any initial signature required by the specific file format. A "box" may be an object-oriented building block defined by a unique type identifier and length. Typically, a segment is contained in one file. A movie container (movie box) may contain metadata for other boxes of the file, and video and audio frames may be contained in media data containers, media fragments, or other elements, and may be provided in other files. In some examples, one or more of segments 310 may comprise initialization segments, which may correspond to stream access points and include initialization data for subsequent segments of the representation. Alternatively, segments 310 may be self-initializing.

Segmentation unit 302 may store segments 310 in data storage system 300 (406). Various examples of segmentation unit 302 may store segments 310 in various ways. For example, segmentation unit 302 can store segments 310 as separate files. In another example, segmentation unit 302 can store segments 310 as binary large objects (BLOBs) in one or more relational databases.

After segmentation unit 302 generates and stores segments 310, priority unit 304 may associate priority values with segments 310 (408). Priority unit 304 can associate priority values with segments 310 in various ways. For example, priority unit 304 can associate priority values with segments 310 by assigning separate priority values to each of segments 310. In another example, priority unit 304 can associate priority values with segments 310 by assigning separate priority values to each segment group of the media content. In other words, each of segment groups 314 may be assigned a separate priority value. Hence, in this example, priority unit 304 may associate each of the segments in a given segment group with the priority value assigned to the given segment group.

Priority values can be represented in various ways. In some examples, priority unit 304 may represent high priority values (i.e., little or no playback quality differences) as high numbers and represent low priority values (i.e., large quality differences) as low numbers. For instance, in some of these examples, 1.0 is the highest possible priority value and 0.0 is the lowest possible priority value. Other examples represent high priority values as low numbers and represent low priority values as high numbers. For instance, in some of these examples, 0.0 is the highest possible priority value and 1.0 is the lowest possible priority value. In this manner, the priority values may describe a relative importance of selecting a segment for a particular temporal section from a higher bit rate representation of the media content.

In examples where priority unit 304 assigns separate priority values to each of segments 310, priority unit 304 can assign the priority values in various ways. For example, priority unit 304 can assign priority values to segments 310 such that a segment's priority value is correlated with an amount of computed distortion in the segment. In examples where the media content is a video, inaccuracies in color or shape, blocky artifacts, ringing artifacts, and other inaccuracies contribute to greater amounts of computed distortion. In this example, priority unit 304 can perform a distortion evaluation process on each of segments 310. When priority unit 304 performs the distortion evaluation process on one of segments 310, priority unit 304 may determine an amount of computed distortion in the segment. In this example, priority unit 304 may assign a high priority value to the segment when the segment has a small amount of computed distortion. In contrast, priority unit 304 may assign a lower priority value to the segment when the segment has a larger amount of computed distortion. In other words, as the amount of computed distortion in the segment increases, priority unit 304 may assign progressively lower priority values to the segment.

In some examples, a video encoder (e.g., of segmentation unit 302) may provide residual values for blocks of frames or slices of video data to priority unit 304. Priority unit 304 may assign priority values based on the cumulative (or average) residual values for pictures or slices in the segment. In addition, or in the alternative, a human operator may assign priorities to the segments using priority unit 304. In some instances, the human operator may assign a wider range of priorities to higher action scenes in order to achieve a desired visual quality, while the human operator may be able to assign a narrower range of priorities to lower action scenes. In some examples, priority unit 304 may assign the priority of a segment by dividing a bit rate for the segment by a peak bit rate, which may be adjusted by a human operator. Because the bit rate for the segment is less than the peak bit rate, the priority of the segment may be effectively capped at a maximum value, e.g., 1.0. In some examples, the peak bit rate is not fixed for all temporal sections of the media data. For example, higher action scenes may have a higher value for the peak bit rate, while lower action scenes may have a lower value for the peak bit rate. In this manner, the priority values for segments may be automatically or semi-automatically assigned by, e.g., priority unit 304.

Table 1, presented below, contains example priority values assigned to segments 310 in segment groups 314.

TABLE 1

| Representation bit rate | Segment Group 314A | Segment Group 314B | Segment Group 314C | Segment Group 314D |
| --- | --- | --- | --- | --- |
| 3.0 Mbps | 1.0 | 1.0 | 1.0 | 1.0 |
| 1.0 Mbps | 0.3 | 0.3 | 0.9 | 0.6 |
| 500 Kbps | 0.1 | 0.1 | 0.8 | 0.3 |

With respect to the example of FIG. 2, segment groups 314A-314D may correspond to video sequences 202A-202D, respectively.

Furthermore, in examples where priority unit 304 assigns priority values to segments, priority unit 304 can assign the priority values in various ways. For example, the media content can be a video. In this example, priority unit 304 may assign priority values to segments in a segment group based on a degree to which visual quality diminishes in lower bit rate segments in the segment group. For instance, priority unit 304 may assign relatively high priority values to higher bit rate segment in the segment group if lower bit rate segments in the segment group have noticeably diminished visual quality. Conversely, priority unit 304 may assign relatively low priority values to higher bit rate segments in the segment group if the lower bit rate segments in the segment group have less noticeably diminished visual quality. In this way, the priority values of the segments may be correlated with amounts of perceptual distortion perceivable in the segments by the human nervous system (e.g. giving priority to luminance over chrominance). In other examples, priority unit 304 may assign priority values to segments based on the video mean opinion score (VMOS) described in ITU-T recommendation BT.500.

In another example where priority unit 304 assigns priority values to segment groups 314, examples of priority unit 304 may perform a comparison operation for each of segment groups 314. In this example, during the comparison operation for a segment group, priority unit 304 may compare amounts of distortion in different segments in the segment group. In this example, priority unit 304 can assign priority values to each segments in segment groups 314 based on amounts by which distortion levels differ among segments in the segment group. In this example, priority unit 304 can assign relatively high priority values to higher bit rate segments in a segment group when the amounts of distortion in the segments of the segment group differ by a relatively large amount. In this example, priority unit 304 can assign relatively low priority values to higher bit rate segments in the segment group when the amounts of distortion in the segments of the segment group differ by a relatively small amount. For example, distortion can be measured in Peak Signal to Noise Ratio (PSNR) by comparing uncompressed video frame to the compressed and hence distorted video frame. In this example, a PSNR above 33 dB may be considered high quality and hence low distortion; a PSNR below 28 dB may be considered low quality and hence high distortion; a PSNR value between 28 dB-33 dB may be considered medium quality and medium distortion.

In another example, priority unit 304 can assign priority values based on the amount of motion experienced by the objects inside a video frame. For example, optical-flow based motion estimation techniques can be used to estimate a motion flow field for each video frame. The motion flow field may consist of motion vectors (comprised of direction and magnitude) for each spatial region of the video frame. The aggregation of motion vector magnitudes along a temporal section of video frames can be used to indicate the total amount of motion for the given temporal section of video.

After the priority values have been associated with segments 310, manifest generation unit 306 generates manifest file 312 (410). Data storage system 300 stores manifest file 312 (412). In some examples, manifest generation unit 306 may receive priority values from priority unit 304. In such examples, manifest generation unit 306 may generate manifest file 312 such that manifest file 312 specifies the priority values associated with segments 310. Furthermore, in some examples, manifest file 312 specifies URLs for segments 310. As discussed elsewhere in this disclosure, client device 102 can, in some examples, use the URLs for segments 310 to retrieve segments 310 from server device 104.

Manifest file 312 can be formatted in various ways. For example, manifest file 312 can be formatted as an Extensible Markup Language (XML) document. In this example, manifest file 312 may contain segment elements that correspond to the segments. The segment element corresponding to a segment may contain a URL element that specifies the URL of the segment and a priority element that specifies the priority value associated with the segment.

Subsequently, server application 308 may receive a manifest request message from client device 102 (414). In response to the message, server application 308 may send a copy of manifest file 312 to client device 102 (416).

After server application 308 sends the copy of manifest file 312 to client device 102, server application 308 may receive a series of segment request messages from client device 102 (418). Each of the segment request messages may request copies of one or more of segments 310. The requested segments may be from different representations 316. That is, the segment request messages received from client device 102 may specify segments of different ones of representations 316. Server application 308 may send the requested copies of segments 310 to client device 102 in response to the segment request messages (420).

In this manner, the method of FIG. 4 may represent an example of a method for providing video data via an adaptive streaming network protocol. The method may comprise sending information that indicates priorities for segments. Each of the segments 310 may be retrievable individually. Segments 310 may correspond to particular temporal sections of representations 316 of multimedia content. Each of representations 316 of the multimedia content may include video data encoded at a different bit rate. The method may also include sending requested segments via the adaptive streaming network protocol in response to one or more requests from client device 102. The requested segments may be ones of the segments 310 specified by the requests.

In the example of FIG. 4, the priority values are included in a manifest file. In other examples, the priority values may be included in metadata boxes of a media stream instead of in a manifest file. In some examples, the metadata boxes may be existing metadata boxes in a media container format. For instance, the priority values may be included in SIDX boxes in the MPEG-4 standard with ISO base media file format (BMFF). In other examples, the priority values may be included in dedicated metadata boxes added to one or more existing media container formats.

Figure 5:
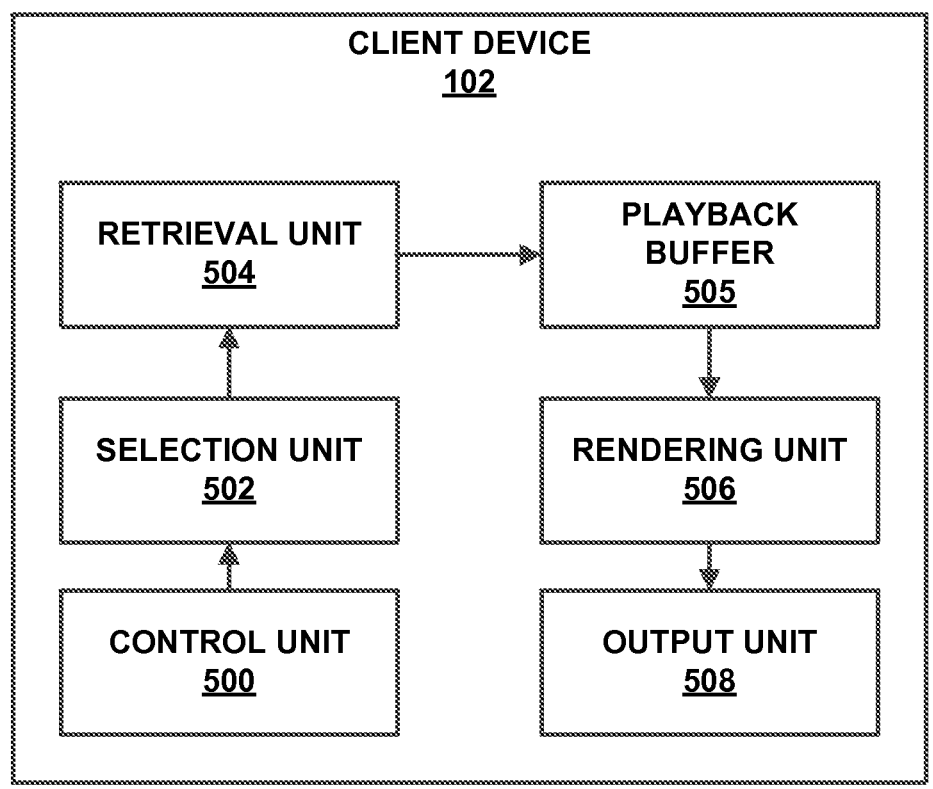
FIG. 5 is a block diagram illustrating an example configuration of the client device.

FIG. 5 is a block diagram that illustrates an example configuration of client device 102. In the example of FIG. 5, client device 102 implements a control unit 500, a selection unit 502, a retrieval unit 504, a playback buffer 505, a rendering unit 506, and an output unit 508. Client device 102 can implement control unit 500, selection unit 502, retrieval unit 504, playback buffer 505, rendering unit 506, and output unit 508 in various ways. For example, client device 102 can implement control unit 500, selection unit 502, retrieval unit 504, rendering unit 506, and/or output unit 508 when one or more processing units, such as general purpose microprocessors or graphics processing units, of client device 102 execute particular instructions. In another example, client device 102 can comprise one or more ASICs that cause client device 102 to implement control unit 500, selection unit 502, retrieval unit 504, rendering unit 506, and/or output unit 508. In various examples, client device 102 can implement playback buffer 505 using various types of computer storage media.

Figure 6:
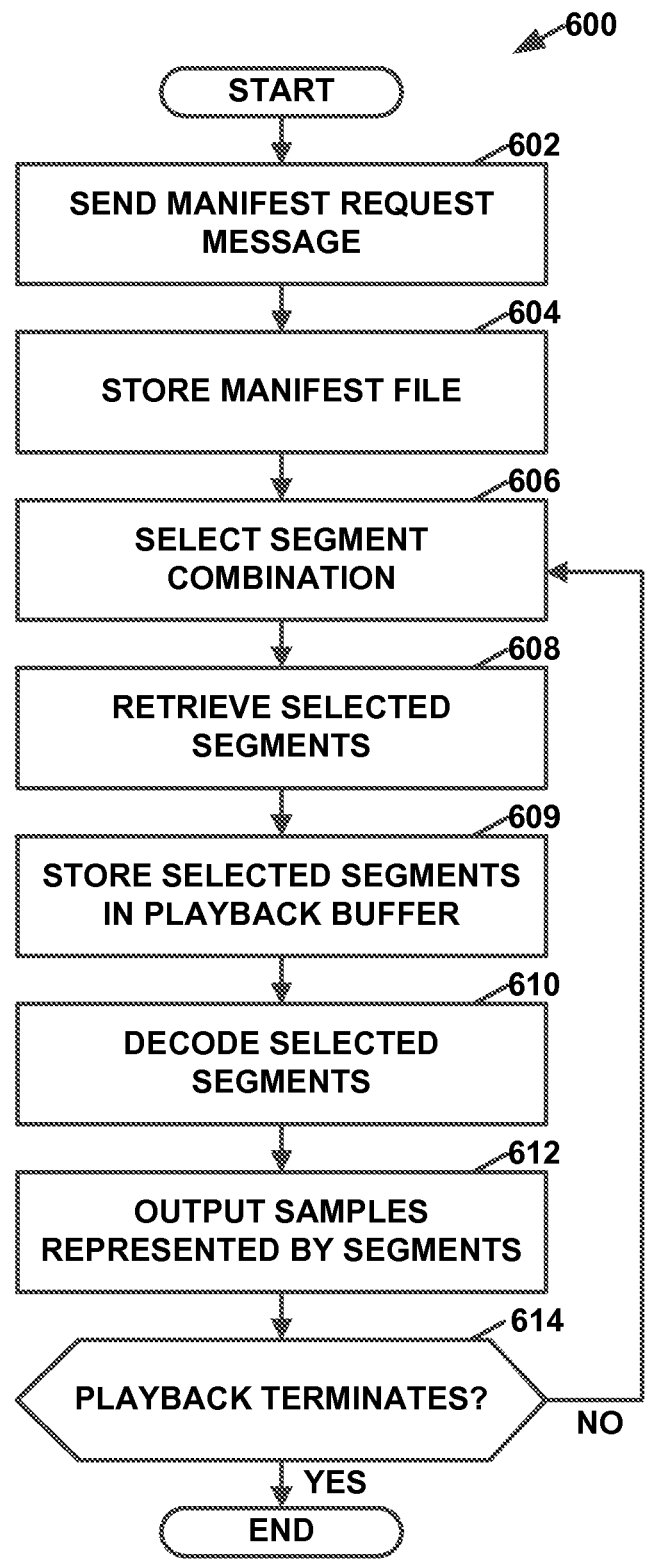
FIG. 6 is a flowchart illustrating an example operation performed by the client device to present the media content to the user.

FIG. 6 is a flowchart illustrating an example operation 600 performed by client device 102 to present the media content to a user. After client device 102 starts operation 600, control unit 500 of client device 102 may retrieve manifest file 312 by sending a manifest request message to server device 104 (602). In some examples, the manifest request message requests a copy of manifest file 312. In other examples, the manifest request message specifies a path associated with the media content in general. The manifest request message can be formatted in various ways. For example, the manifest request message may comprise an HTTP request.

Control unit 500 stores manifest file 312 for the media content (604). In the example of FIG. 6, control unit 500 may store manifest file 312 after receiving manifest file 312 in response to the manifest request message. In examples consistent with FIG. 6, manifest file 312 may specify the priority values associated with segments 310. In this way, client device 102 may receive the priority values associated with segments 310. Furthermore, in examples consistent with FIG. 6, manifest file 312 may specify URLs of segments 310.

Readers will understand that in other examples, client device 102 receives the priority values associated with segments 310 and/or URLs of segments 310 in other ways. For example, client device 102 can receive the priority values from segment index boxes of segments 310. In another example, client device 102 can receive the priority values from a metadata track of the media content.

After receiving manifest file 312, selection unit 502 of client device 102 may select a segment combination for an upcoming time period (606). The segment combination is a set of segments that includes one segment from each segment group in the upcoming time period. The upcoming time period may correspond to a temporal section of the media content. For ease of explanation, this document may refer to segment groups containing segments that correspond to temporal sections within the temporal section of the upcoming time period as being segment groups in the upcoming time period. For example, segment groups 314A and 314B could be in one window, segment group 314N and another segment group of the media content could be in another window, and so on.

In various examples, the windows may include various numbers of segment groups. For example, windows can include a fixed number of segment groups. For instance, windows can each include three segment groups. In another example, windows can each include four segment groups. In examples in which windows includes fixed numbers of segments, a last window can include fewer than the fixed number of segment groups. In another example, windows can include all segment groups of the media content. In yet another example, windows can include variable numbers of segment groups.

Figure 7:
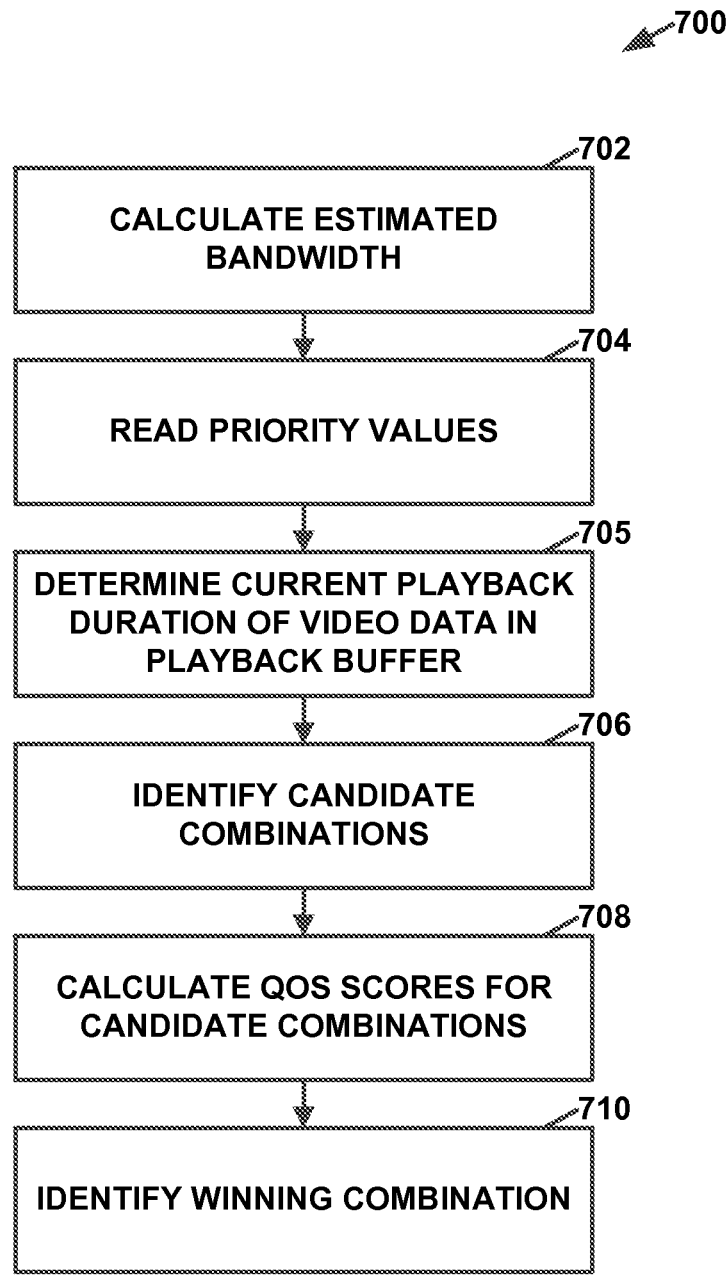
FIG. 7 is a flowchart illustrating an example operation performed by the client device to select a segment combination for an upcoming time period.
Figure 8:
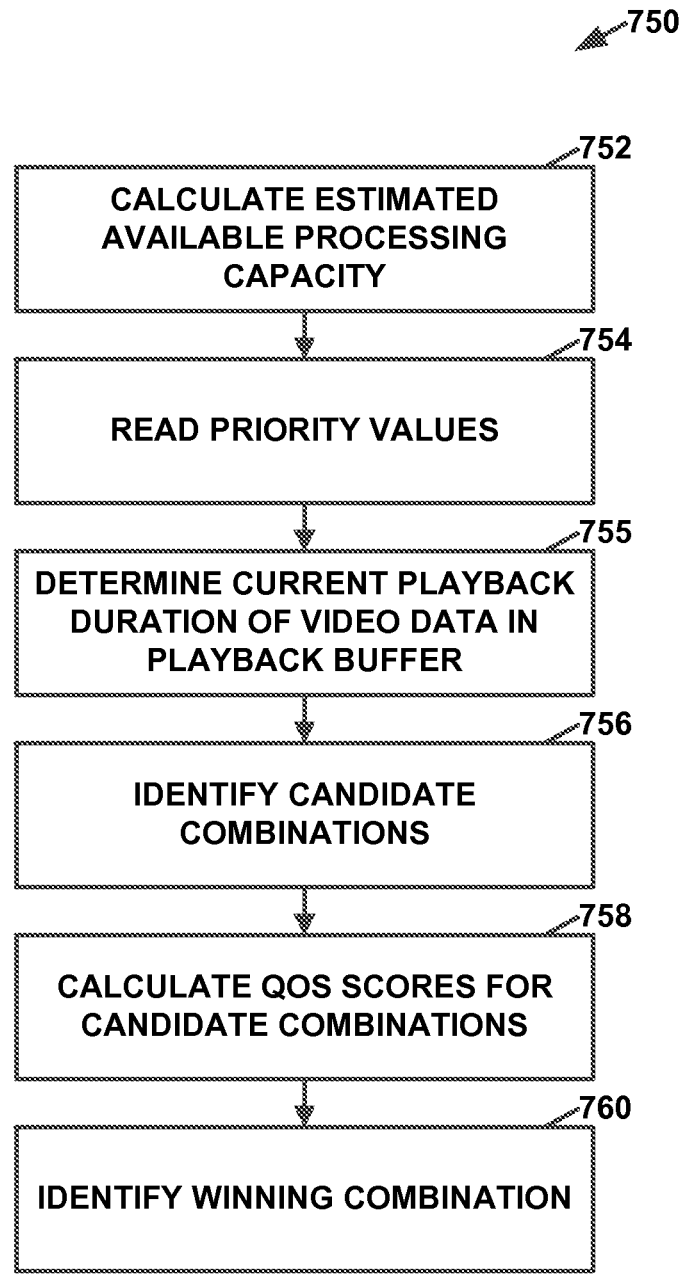
FIG. 8 is a flowchart illustrating an example operation performed by the client device to select a segment combination for an upcoming time period.

Selection unit 502 can select the segment combination for the upcoming time period in various ways. FIGS. 7 and 8, described in detail below, illustrate example operations performed by selection unit 502 to select the segment combination for the upcoming time period. Readers will understand that selection unit 502 may perform operations other than that illustrated in the examples of FIGS. 7 and 8 to select the segment combination for the upcoming time period. For ease of explanation, this disclosure can refer to the segments in the selected segment combination as the selected segments.

After selection unit 502 selects the segment combination for the upcoming time period, retrieval unit 504 of client device 102 may retrieve the selected segments from server device 104 according to an adaptive streaming network protocol (608). Retrieval unit 504 can retrieve the selected segments from server device 104 in various ways. For example, manifest file 312 can specify URLs for segments 310. In this example, retrieval unit 504 may send segment request messages that request the resources identified by the URLs for the selected segments. Retrieval unit 504 may receive the selected segments from server device 104 in response to the segment request messages. In some such examples, the segment request messages are HTTP messages that request the copies of the selected segments. The HTTP messages are addressed to computing devices associated with domain name portions of the selected segments' URLs. The HTTP messages may request the resources indicated by path portions of the selected segments' URLs. In other words, retrieval unit 504 may use the URL for a selected segment to generate a HTTP request message that requests a copy of the selected segment. In examples where server device 104 stores multiple segments 310 in a single file, the HTTP request messages can be HTTP partial get requests.

Once client device 102 has retrieved the selected segments from server device 104, retrieval unit 504 may store the selected segments in playback buffer 505 (609). Rendering unit 506 may remove segments from playback buffer 505 and may decode the segments in the segment combination to produce samples suitable for output by output unit 508 (610). For instance, rendering unit 506 can decode the selected segments to produce video frames or audio samples. Output unit 508 may then output the samples represented by the selected segments (612). In this way, output unit 508 may play back the selected segments.

If playback of the media content terminates after output unit 508 outputs the samples represented by the selected segments ("YES" of 614), operation 600 may end. Playback of the media content can terminate for various reasons. For example, if the media content is a video, playback of the media content can terminate when output unit 508 has presented the last frame of the video. In another example, playback of the media content can terminate when a user instructs client device 102 to terminate playback of the media content.

If playback of the media content does not terminate after output unit 508 outputs the media represented by the selected segments ("NO" of 614), selection unit 502 may select a segment combination for a next upcoming time period (606). The next upcoming time period can include segment groups containing segments that correspond to temporal sections of the media content that follow the temporal sections of the media content that correspond to the segments in the segment groups of the current upcoming time period. Steps 608, 610, 612, and 614 may then repeat until playback of the media content terminates.

FIG. 7 is a flowchart illustrating an example operation 700 performed by client device 102 to select a segment combination for an upcoming time period. After operation 700 starts, selection unit 502 may calculate an estimated bandwidth (702). The estimated bandwidth may be an estimate of the rate at which client device 102 will be able to receive data from server device 104 via network 106. For example, selection unit 502 can determine that client device 102 will likely be able to receive data from server device 104 at a rate of 0.58 Mbps.

Selection unit 502 can calculate the estimated bandwidth in various ways. For example, selection unit 502 can calculate the estimated bandwidth based on how much data client device 102 was able to receive from server device 104 during the past sixty seconds. In another example, server device 104 may send bandwidth messages to client device 102. The bandwidth messages may indicate the maximum rate at which server device 104 will send data to client device 102. In this example, selection unit 502 may determine the estimated bandwidth based at least partially on the rates indicated by the bandwidth messages.

In addition, selection unit 502 may read the priority values associated with applicable segments from manifest file 312 (704). Each of the applicable segments may be in a segment group within the upcoming time period. For instance, in the example of FIG. 3, if the upcoming time period includes segment groups 314A and 314B, segments 310 in segment groups 314A and 314B may be the applicable segments.

In other examples, selection unit 502 can read the priority values associated with the applicable segments from other sources. For example, selection unit 502 can read the priority values associated with the applicable segments from segment index boxes of the segments. In another example, selection unit 502 can read the priority values associated with the applicable segments from a metadata track of the media content.

In addition, selection unit 502 may determine a current playback duration of video data in playback buffer 505 (705). In some examples, the current playback duration of the video data in playback buffer 505 may be an amount of time that would elapse for rendering unit 506 and output unit 508 to play back the video data stored in playback buffer 505 if retrieval unit 504 added no new video data (e.g., segments) to playback buffer 505. For example, rendering unit 506 and output unit 508 may continue playing back video data from playback buffer 505 for ten seconds even if retrieval unit 504 added no new video data to playback buffer 505.

After estimating the available bandwidth, after reading the priority values for the applicable segments, and after determining the current playback duration of the video data in playback buffer 505, selection unit 502 may identify one or more candidate combinations (706). A segment combination may be a set of segments that includes one segment from each segment group within the upcoming time period. In different examples, selection unit 502 may identify segment combinations in different ways.

In some examples, selection unit 502 may identify a segment combination as a candidate combination when a cumulative bit rate of the segments in the segment combination is not significantly greater than the estimated bandwidth. In some examples, the cumulative bit rate of the segments is an average of the bit rates of the segments. For example, if each of segments 310 represents three seconds worth of samples and the upcoming time period includes four segment groups, the amount of time associated with the upcoming time period can be twelve seconds. In other words, a playback duration of the upcoming time period is twelve seconds. In this example, selection unit 502 can calculate an estimated bandwidth of 1.75 Mbps. Hence, in this example, client device 102 may be able to receive approximately 21.0 megabits from server device 104 every twelve seconds. Furthermore, in this example, segments A and B correspond to a first segment group, segments C and D correspond to a second segment group, and segments E and F correspond to a third segment group. In this example, segments A, C, and E have bit rates of 3.0 Mbps and segments B, D, and F have bit rates of 1.0 Mbps. In this example, the available segment combinations are A-C-E, A-C-F, A-D-E, A-D-F, B-C-E, B-C-F, B-D-E, and B-D-F. However, the average bit rate for segment combination A-C-E is 3.0 Mbps. Consequently, client device 102 would need to receive 36.0 megabits in twelve seconds in order to receive combination A-C-E without rebuffering playback of the media content. 36.0 megabits is greater than the 21.0 megabits that server device 104 can transfer to client device 102 in twelve seconds. Hence, the segment combination A-C-E is not a candidate combination. Because the average bit rates of the remaining segment combinations are less than the estimated bandwidth, the remaining segment combinations are candidate combinations.

In some examples, selection unit 502 may identify a segment combination as a candidate combination only when the average bit rate of segments in the segment combination strictly does not exceed the estimated bandwidth. In other examples, selection unit 502 may identify a segment combination as a candidate combination even if the average bit rate of segments in the segment combination is slightly greater than the estimated bandwidth. For example, a segment combination can be a candidate combination when the average of the bit rates of the segments in the segment combination is less than 10% greater than the estimated bandwidth.

In some examples, selection unit 502 may select segments based on the priority values for the segments, the estimated bandwidth, and the current playback duration of video data in playback buffer 505. Playback buffer 505 may store video data until the video data is played back. Storing video data in playback buffer 505 may prevent stoppages during playback of the video data due to temporary network bandwidth reductions. In such examples, selection unit 502 may identify a segment combination as a candidate combination when an estimated transfer time for the segments in the segment combination is less than or equal to a playback duration of the segments in the segment combination plus the current playback duration of the video data in playback buffer 505.

The estimated transfer time for the segments in the segment combination may be based on the estimated bandwidth and the total number of bits in the selected segments. For example, the estimated transfer time for the segments in the segment combination may be equal to the total number of bits in the selected segments divided by the estimated bandwidth. In this example, if the total number of bits in the segments is 36.0 megabits and the estimated bandwidth is 1.75 Mbps, the estimated transfer time for the segments may be approximately 20.6 seconds. In this example, the playback duration of the segments may be 12.0 seconds. Hence, in this example, if the current playback duration of video data in playback buffer 505 is greater than 8.6 seconds (i.e., 20.6 seconds-12.0 seconds), selection unit 502 may consider the segment combination to be a candidate combination.

In some examples, selection unit 502 may determine that a segment combination is a candidate combination when the estimated transfer time for the segment combination is less than or equal to the playback duration of the segment combination plus a time duration based on the current playback duration of the video data in playback buffer 505. For example, selection unit 502 may generate a duration value by subtracting a given amount of time from the full current playback duration of the video data in playback buffer 505. In this example, selection unit 502 may determine whether a segment combination is a candidate combination by determining whether the estimated transfer time for the segment combination is less than or equal to the playback duration of the segment combination plus the generated duration value. In another example, selection unit 502 may generate a similar duration value as a fraction of the full current playback duration of the video data in playback buffer 505 and use this duration value in a similar way.

After identifying the candidate combinations, selection unit 502 may calculate Quality of Service (QoS) scores for each of the candidate combinations (708). The QoS score for a candidate combination may be based on the priority values associated with the segments in the candidate combination. For example, if a candidate combination includes segments A, B, and C, the QoS score for the candidate combination may be based on the priority values associated with the segments A, B, and C.

Selection unit 502 can calculate the QoS scores for the candidate combinations in various ways. For example, separate priority values can be assigned to each of segments 310. In this example, selection unit 502 can calculate the QoS score for a given candidate combination by summing the priority values assigned to the segments in the given candidate combination. For instance, if the priority values assigned to the segments in the given candidate combination are 1.0, 1.0, and 0.8, the QoS score for the given candidate combination may be 2.8. In another example, the priority values associated with the segments of a candidate combination may be based on the PSNR values of the segments. Hence, in this example, selection unit 502 may determine the QoS score for a given candidate combination based on the PSNR values of the segments in the given candidate combination. In this example, the QoS score for the given candidate combination may be equal to an overall PSNR value of the given candidate combination.

In another example, separate priority values may be assigned to each of segments 310. In this example, selection unit 502 can calculate the QoS score for a given candidate combination by calculating a geometric mean of the priority values assigned to the segments in the given candidate combination. In other words, if there are n segments in the given candidate combination, selection unit 502 may calculate the QoS score for the given candidate combination by multiplying the priority values assigned to the segments and taking the n'th root of the resulting value. For instance, if the priority values assigned to the segments in the given candidate combination are 0.1, 1.0, 1.0, and 0.3, the QoS score for the given candidate combination may be 0.4162.

In yet another example, separate priority values may be assigned to each of segment groups 314. In this example, selection unit 502 uses the priority values assigned to segment groups 314 to calculate separate priority values for each of segments 310. In various examples, selection unit 502 can use the priority values assigned to segment groups 314 to calculate the separate priority values for each of segments 310 in various ways. For example, selection unit 502 can use the priority value assigned to a given segment group to calculate a priority value for a given segment in the given segment group by multiplying a bit rate of the given segment by the priority score assigned to the given segment group. Continuing the example of the previous paragraph, after calculating the priority scores for each of the segments in each of the candidate combinations, selection unit 502 may calculate QoS scores for the candidate combinations. Selection unit 502 can calculate the QoS scores for the candidate combinations in various ways. For example, selection unit 502 can calculate the QoS scores for the candidate combinations by summing the priority values for the segments in the candidate combinations, calculating a geometric mean of the priority values for the segments in the candidate combinations, or calculating the QoS scores for the candidate combinations in another way.

In some instances, the nature of the problem being solved by client device 102 may be described by the "knapsack" problem. The "knapsack" problem is described in Papadimitirou, C., and K. Steiglitz, Combinational Optimization: Algorithms and Complexity, New Jersey: Prentice-Hall, 1982. In general, this problem may be described as determining how best to pack objects of the greatest volumes into a finite-sized "knapsack" with a limited capacity. With respect to the techniques of this disclosure, the problem may correspond to client device 102 attempting to pack the largest total priority set for an upcoming N number of segments into a fixed bin, namely, the amount of bandwidth determined to be available for retrieving the N segments. Many types of knapsack problems are NP-hard (where "NP" is an initialism for "nondeterministic polynomial time"), but some algorithms that run in pseudo-polynomial time are known.

After calculating the QoS scores for the candidate combinations, selection unit 502 may identify a winning combination from among the candidate combinations (710). Selection unit 502 can identify the winning combination in various ways. For example, in instances where high priority values have high numerical values, the winning combination has a QoS score that is greater than or equal to the QoS scores for each other one of the candidate combinations. For example, if the candidate combinations have QoS scores of 0.416, 0.4695, and 0.221, the winning combination may be the candidate combination having the QoS score of 0.4695. In instances where high priority values have low numerical values, the winning combination may have a QoS score that is less than or equal to the QoS scores for each other one of the candidate combinations. In this way, selection unit 502 may select a given segment from among the segments in one of the segment groups of the segment sequence based at least in part on the priority values of the segments in the segment group and the priority values of the segments belonging to the additional resources groups of the segment sequence. In another example, the winning combination may be determined via min-max optimization, where the objective is to maximize the minimum-QoS segment. In this example, if high priorities indicate higher quality of service, and the candidate combinations have minimum QoS values of 0.32, 0.40, and 0.4125, then the winning combination may be the candidate combination having the QoS score of 0.4125.

FIG. 8 is a flowchart illustrating an example operation 750 performed by client device 102 to select a segment combination for an upcoming time period. The discussion above has focused on bandwidth. However, the techniques of this disclosure are not so limited. Rather, the techniques of this disclosure may be generically applicable to an estimated throughput. A throughput may be a volume of data handled over a given period. The bandwidth of network 106 may be volume of data transferred over network 106 in the upcoming time period. In the example of FIG. 8, the estimated throughput is a volume of encoded media data that can be decoded by one or more processors in the upcoming time period.

Operation 750 is similar in some ways to operation 700 (FIG. 7). However, operation 750 uses processing capacity in place of network bandwidth. In examples that use operation 750, client device 102 may store video data in advance and does not necessary transfer any data from a server device, such as server device 104.

After operation 750 starts, selection unit 502 may calculate an estimated available processing capacity for an upcoming time period (752). The estimated available processing capacity for the upcoming time period may be an estimate of the amount of encoded media data that client device 102 will be able to decode during the upcoming time period. In addition, selection unit 502 may read the priority values associated with applicable segments from manifest file 312 or other sources (754). Each of the applicable segments may be in a segment group within the upcoming time period.

Selection unit 502 may determine a current playback duration of video data in playback buffer 505 (755). In some examples, the current playback duration of the video data in playback buffer 505 may be an amount of time that would elapse for rendering unit 506 and output unit 508 to play back the video data stored in playback buffer 505 if retrieval unit 504 added no new decoded video data (e.g., segments) to playback buffer 505. After estimating the available processing capacity, after reading the priority values for the applicable segments, and after determining the current playback duration of the video data in playback buffer 505, selection unit 502 may identify one or more candidate combinations (756). A segment combination may be a set of segments that includes one segment from each segment group within the upcoming time period.

In some examples, selection unit 502 may identify a segment combination as a candidate combination when the amount of encoded media data in the segments in the segment combination is not significantly greater than the estimated available processing capacity (or more generally, estimated throughput). In some examples, selection unit 502 may identify a segment combination as a candidate combination only when the normalized amount of encoded data in the segments in the segment combination strictly does not exceed the estimated available processing capacity for the upcoming time period.

In some examples, selection unit 502 may select segments based on the priority values for the segments, the estimated available processing capacity, and the current playback duration of video data in playback buffer 505. Playback buffer 505 may store decoded video data until the decoded video data is played back. Storing decoded video data in playback buffer 505 may prevent stoppages during playback of the decoded video data due to temporary network bandwidth reductions. In such examples, selection unit 502 may identify a segment combination as a candidate combination when an estimated time to decode the segments in the segment combination given the available processing capacity is less than or equal to a playback duration of the segments in the segment combination plus the current playback duration of the video data in playback buffer 505.

After identifying the candidate combinations, selection unit 502 may calculate Quality of Service (QoS) scores for each of the candidate combinations (758). The QoS score for a candidate combination may be based on the priority values associated with the segments in the candidate combination. Selection unit 502 may calculate the QoS scores for the candidate combinations in the ways described by the examples provided above with regard to FIG. 7.

After calculating the QoS scores for the candidate combinations, selection unit 502 may identify a winning combination from among the candidate combinations (760). Selection unit 502 can identify the winning combination in various ways, such as the ways described above with regard to FIG. 7.

In this way, client device 102 may determine an estimated throughput and select, based at least in part on the estimated throughput and priority values for segments of representations of multimedia content, one or more of the segments. The representations include video data are encoded at different bit rates, each of the segments are retrievable individually, and the segments correspond to particular temporal sections of the representations. Client device 102 may process (e.g., retrieve and/or decode) the one or more selected segments.

Figure 9:
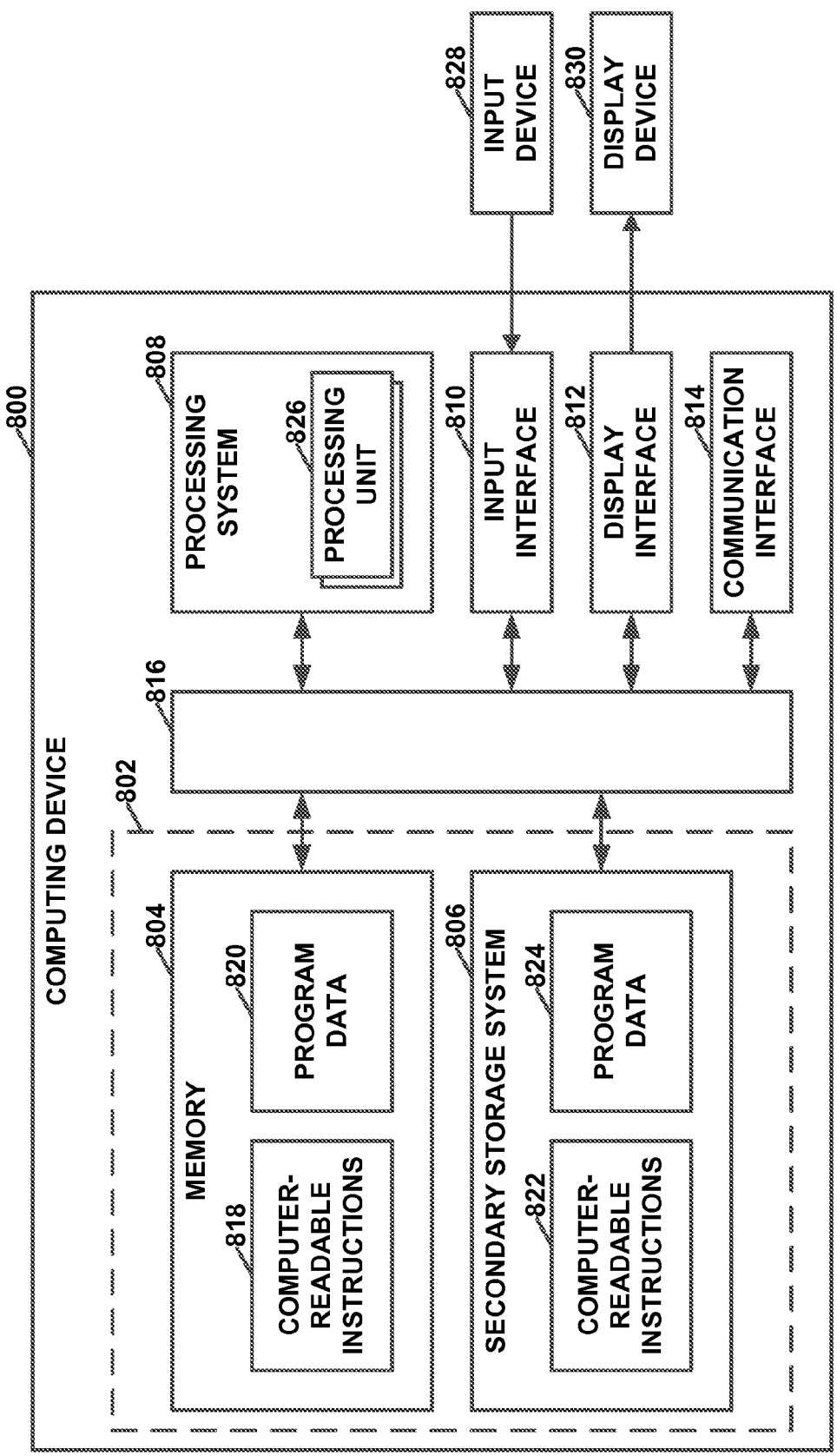
FIG. 9 is a block diagram illustrating an example computing device.

FIG. 9 is a block diagram of an example computing device 800. Computing device 800 is a physical device that processes information. In some instances, client device 102 and server device 104 comprise one or more computing devices similar to computing device 800.

Computing device 800 comprises a data storage system 802, a memory 804, a secondary storage system 806, a processing system 808, an input interface 810, a display interface 812, a communication interface 814, and one or more communication media 816. Communication media 816 may enable data communication between processing system 808, input interface 810, display interface 812, communication interface 814, memory 804, and secondary storage system 806. Readers will understand that computing device 800 can include components in addition to those shown in the example of FIG. 9. Furthermore, readers will understand that some computing devices do not include all of the components shown in the example of FIG. 9.

A computer-readable medium may be a medium from which processing system 808 can read data. The term computer-readable media can refer to computer storage media and communications media. Computer storage media may include physical devices that store data for subsequent retrieval. Computer storage media may be non-transitory. For instance, computer storage media do not exclusively comprise propagated signals. Computer storage media may include volatile storage media and non-volatile storage media. Example types of computer storage media may include random-access memory (RAM) units, read-only memory (ROM) devices, solid state memory devices, optical discs (e.g., compact discs, DVDs, BluRay discs, etc.), magnetic disk drives, magnetic tape drives, and other types of devices that store data for subsequent retrieval. Communication media may include media over which one device can communicate data to another device. Example types of communication media may include communication networks, communications cables, wireless communication links, communication buses, and other media over which one device is able to communicate data to another device.

Data storage system 802 may be a system that stores data for subsequent retrieval. In the example of FIG. 9, data storage system 802 comprises memory 804 and secondary storage system 806. Memory 804 and secondary storage system 806 may store data for later retrieval. In the example of FIG. 9, memory 804 stores computer-readable instructions 818 and program data 820. Secondary storage system 806 stores computer-readable instructions 822 and program data 824. Physically, memory 804 and secondary storage system 806 may each comprise one or more computer storage media.

Processing system 808 may be coupled to data storage system 802. Processing system 808 may read and execute computer-readable instructions. Execution of the computer-readable instructions by processing system 808 may cause computing device 800 to perform the actions indicated by the computer-readable instructions. For example, execution of the computer-readable instructions by processing system 808 can cause computing device 800 to provide Basic Input/Output Systems, operating systems, system programs, application programs, or can cause computing device 800 to provide other functionality. In another example, execution of the computer-readable instructions by processing system 808 can cause computing device 800 to provide segmentation unit 302, priority unit 304, manifest generation unit 306, and/or server application 308 of server device 104. In yet another example, execution of the computer-readable instructions by processing system 808 can cause computing device 800 to provide control unit 500, selection unit 502, retrieval unit 504, rendering unit 506, and output unit 508 of client device 102.

Processing system 808 may read the computer-readable instructions from one or more computer-readable media. For example, processing system 808 can read and execute computer-readable instructions 818 and 822 stored on memory 804 and secondary storage system 806.

Processing system 808 may comprise one or more processing units 826. Processing units 826 may comprise physical devices that execute computer-readable instructions. Processing units 826 can comprise various types of physical devices that execute computer-readable instructions. For example, one or more of processing units 826 can comprise a microprocessor, a processing core within a microprocessor, a digital signal processor, a graphics processing unit, a general-purpose graphics processing unit, or another device or physical device that executes computer-readable instructions.

Input interface 810 may enable computing device 800 to receive input from an input device 828. Input device 828 may comprise a device that receives input from a user. Input device 828 can comprise various types of devices that receive input from users. For example, input device 828 can comprise a keyboard, a touch screen, a mouse, a microphone, a keypad, a joystick, a brain-computer interface device, or another type of device that receives input from a user. In some instances, input device 828 may be integrated into a housing of computing device 800. In other instances, input device 828 may be outside a housing of computing device 800.

Display interface 812 may enable computing device 800 to display output on a display device 830. Display device 830 may be a device that displays output. Example types of display devices may include monitors, touch screens, display screens, televisions, and other types of devices that display output. In some instances, display device 830 may be integrated into a housing of computing device 800. In other instances, display device 830 may be outside a housing of computing device 800.

Communication interface 814 may enable computing device 800 to send and receive data over one or more communication media. Communication interface 814 can comprise various types of devices. For example, communication interface 814 can comprise a Network Interface Card (NIC), a wireless network adapter, a Universal Serial Bus (USB) port, or another type of device that enables computing device 800 to send and receive data over one or more communication media.

In one or more examples, the functions described may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the invention defined by the following claims.

What is claimed is:

1. A method for processing video data, the method comprising:
   determining an estimated throughput;
   receiving, from a server device, information indicative of a respective priority value for each respective segment group of a plurality of segment groups, wherein:
      for each respective segment group of the plurality of segment groups:
         the respective segment group is a respective plurality of segments,
         each of the segments of the respective segment group corresponds to a respective temporal section of media content different from temporal sections of the media content to which segments of other segment groups of the plurality of segment groups correspond,
         each respective segment of the respective segment group represents the same respective temporal section of the media content, is retrievable individually, and is from a different representation of a plurality of representations of the media content, each of the representations being encoded at a different bit rate, and
         the respective priority value for the respective segment group indicates an importance of selecting a segment for the respective temporal section from a representation in the plurality of representations that has a higher bit rate than other ones of the representations, and
      the priority value for a first segment group of the plurality of segment groups is different from the priority value for a second, different segment group of the plurality of segment groups, the first segment group and the second segment group including respective segments from the same representation of the plurality of representations;

performing a selection operation that selects a segment of each respective segment group of the plurality of segment groups, wherein performing the selection operation comprises selecting the segments of each respective segment group based at least in part on the estimated throughput and the priority values for the segment groups; and processing the selected segments.

2. The method of claim 1, wherein the estimated throughput is a bandwidth of a communication network.

3. The method of claim 2, further comprising requesting the selected segments in accordance with an adaptive streaming network protocol.

4. The method of claim 1, wherein the estimated throughput is an estimate of an amount of media data that one or more processors are able to decode during an upcoming time period.

5. The method of claim 1, wherein selecting the segments comprises selecting the segments of each respective segment group based on the priority values for the segment groups, the estimated throughput, and additionally a current playback duration of video data in a playback buffer.

6. The method of claim 1, wherein:
the estimated throughput is an estimated bandwidth of a communication network, and
an estimated transfer time for the selected segments is less than or equal to a playback duration of the selected segments plus a current playback duration of video data in a playback buffer, the estimated transfer time for the selected segments being based at least in part on the estimated bandwidth and a total number of bits in the selected segments.

7. The method of claim 1, further comprising:
rendering sequences of frames represented by the selected segments; and
presenting the sequences of frames on a display device.

8. The method of claim 1, further comprising:
storing a manifest file, wherein, for each respective segment group of the plurality of segment groups, the manifest file specifies URLs for the segments of the respective segment group and the information indicative of the priority value for the respective segment group; and
using the URLs for the selected segments to generate requests for the selected segments.

9. The method of claim 1, wherein processing the selected segments comprises decoding the selected segments.

10. The method of claim 9, wherein selecting the segments of each respective segment group comprises:
identifying a plurality of candidate combinations, wherein for each respective candidate combination of the plurality of candidate combinations:
the respective candidate combination includes one segment of each of the segment groups that is within an upcoming time period, and
an average of bit rates of the segments in the respective candidate combination is not significantly greater than the estimated throughput;
calculating, based on the priority values for the segment groups within the upcoming time period, a respective score for each respective candidate combination of the plurality of candidate combinations; and
identifying, based on the scores for the candidate combinations, a winning combination from the plurality of candidate combinations, the selected segments being in the winning combination, wherein the winning combination has a score that is greater than or equal to the scores for each other one of the candidate combinations.

11. The method of claim 10, wherein:
performing the selection operation comprises using the priority values for the segment groups within the upcoming time period to calculate respective priority values for each respective segment in the segment groups within the upcoming time period; and
calculating the respective score for each respective candidate combination of the plurality of candidate combinations comprises, for each respective candidate combination of the plurality of candidate combinations, calculating the respective score for the respective candidate combination by summing the priority values for the segments in the respective candidate combination.

12. The method of claim 10,
wherein calculating the respective score for each respective candidate combination of the plurality of candidate combinations comprises, for each respective candidate combination of the plurality of candidate combinations, calculating the respective score for the respective candidate combination based on peak signal-to-noise ratio values of the segments in the respective candidate combination.

13. The method of claim 10, wherein:
performing the selection operation comprises using the priority values for the segment groups within the upcoming time period to calculate respective priority values for each respective segment in the segment groups within the upcoming time period; and calculating the respective score for each respective candidate combination of the plurality of candidate combinations comprises, for each respective candidate combination of the plurality of candidate combinations, calculating the respective score for the respective candidate combination by calculating a geometric mean of the priority values for the segments in the respective candidate combination.

14. A computing device comprising:
one or more non-transitory computer storage media configured to store video data; and
one or more processors configured to:
determine an estimated throughput;
receive, from a server device, information indicative of respective priority values for each respective segment group of a plurality of segment groups, wherein:
for each respective segment group of the plurality of segment groups:
the respective segment group is a respective plurality of segments,
each of the segments of the respective segment group corresponds to a respective temporal section of media content different from temporal sections of the media content to which segments of other segment groups of the plurality of segment groups correspond,
each respective segment of the respective segment group represents the same respective temporal section of the media content, is retrievable individually, and is from a different representation of a plurality of representations of the media content, each of the representations being encoded at a different bit rate, and
the respective priority value for the respective segment group indicates an importance of selecting a segment for the respective temporal section from a representation in the plurality of representations that has a higher bit rate than other ones of the representations, and the priority value for a first segment group of the plurality of segment groups is different from the priority value for a second, different segment group of the plurality of segment groups, the first segment group and the second segment group including respective segments from the same representation of the plurality of representations;

perform a selection operation that selects a segment of each respective segment group of the plurality of segment groups, wherein the one or more processors are configured such that, as part of performing the selection operation, the one or more processors select the segments of each respective segment group based at least in part on the estimated throughput and the priority values for the segment groups; and process the selected segments.

15. The computing device of claim 14, wherein the estimated throughput is a bandwidth of a communication network.

16. The computing device of claim 15, wherein the one or more processors are configured to request the selected segments in accordance with an adaptive streaming network protocol.

17. The computing device of claim 14, wherein the estimated throughput is an estimate of an amount of media data that the one or more processors are able to decode during an upcoming time period.

18. The computing device of claim 14, wherein the one or more processors are configured to select the segments of each respective segment group based on the priority values for the segment groups, the estimated throughput, and additionally a current playback duration of video data in a playback buffer.

19. The computing device of claim 14, wherein:
the estimated throughput is an estimated bandwidth of a communication network, and
an estimated transfer time for the selected segments is less than or equal to a playback duration of the selected segments plus a current playback duration of video data in a playback buffer, the estimated transfer time for the selected segments being based on the estimated bandwidth and a total number of bits in the selected segments.

20. The computing device of claim 14, wherein to process the selected segments, the one or more processors:
render sequences of frames represented by the selected segments; and
present the sequences of frames on a display device.

21. The computing device of claim 14, wherein:
the computing device stores a manifest file,
for each respective segment group of the plurality of segment groups, the manifest file specifies URLs for the segments of the respective segment group and the information indicative of the priority value for the respective segment group, and
the one or more processors are configured to use the URLs for the selected segments to generate requests for the selected segments.

22. The computing device of claim 14, wherein the one or more processors are configured to:
decode the selected segments.

23. The computing device of claim 14, wherein the one or more processors are configured to:

identify a plurality of candidate combinations, wherein for each respective candidate combination of the plurality of candidate combinations:
the respective candidate combination includes one segment of each of the segment groups that is within an upcoming time period, and
an average of bit rates of the segments in the respective candidate combination is not significantly greater than the estimated throughput;

calculate, based on the priority values for the segment groups within the upcoming time period, a respective score for each respective candidate combination of the plurality of candidate combinations; and identify, based on the scores for the candidate combinations, a winning combination from the plurality of candidate combinations, the selected segments being in the winning combination, wherein the winning combination has a score that is greater than or equal to the scores for each other one of the candidate combinations.

24. The computing device of claim 23, wherein the one or more processors are configured to:
use the priority values for the segment groups within the upcoming time period to calculate respective priority values for each respective segment in the segment groups within the upcoming time period; and
for each respective candidate combination of the plurality of candidate combinations, calculate the respective score for the respective candidate combination by summing the priority values for the segments in the respective candidate combination.

25. The computing device of claim 23, wherein the one or more processors are configured to:
for each respective candidate combination of the plurality of candidate combinations, calculate the respective score for the respective candidate combination based on peak signal-to-noise ratio values of the segments in the respective candidate combination.

26. The method of claim 23, wherein the one or more processors are configured to:
use the priority values for the segment groups within the upcoming time period to calculate respective priority values for each respective segment in the segment groups within the upcoming time period; and
for each respective candidate combination of the plurality of candidate combinations, calculate the respective score for the respective candidate combination by calculating a geometric mean of the priority values for the segments in the respective candidate combination.

27. A computing device comprising:
means for determining an estimated throughput;
means for receiving, from a server device, information indicative of a respective priority value for each respective segment group of a plurality of segment groups, wherein:
for each respective segment group of the plurality of segment groups:
the respective segment group is a respective plurality of segments,
each of the segments of the respective segment group corresponds to a respective temporal section of media content different from temporal sections of the media content to which segments of other segment groups of the plurality of segment groups correspond,
each respective segment of the respective segment group represents the same respective temporal section of the media content, is retrievable individually, and is from a different representation of a plurality of representations of the media content, each of the representations being encoded at a different bit rate, and the respective priority value for the respective segment group indicates an importance of selecting a segment for the respective temporal section from a representation in the plurality of representations that has a higher bit rate than other ones of the representations, and the priority value for a first segment group of the plurality of segment groups is different from the priority value for a second, different segment group of the plurality of segment groups, the first segment group and the second segment group including respective segments from the same representation of the plurality of representations;

means for performing a selection operation that selects a segment of each respective segment group of the plurality of segment groups, wherein the means for performing the selection operation comprises means for selecting the segments of each respective segment group based at least in part on the estimated throughput and the priority values for the segment groups; and means for processing the selected segments.

28. The computing device of claim 27, wherein the estimated throughput is a bandwidth of a communication network.

29. The computing device of claim 27, further comprising means for requesting the selected segments in accordance with an adaptive streaming network protocol.

30. The computing device of claim 27, wherein the estimated throughput is an estimate of an amount of media data that one or more processors are able to decode during an upcoming time period.

31. The computing device of claim 27, comprising: means for decoding the selected segments.

32. The computing device of claim 27, comprising:

means for identifying a plurality of candidate combinations, wherein for each respective candidate combination of the plurality of candidate combinations:

the respective candidate combination includes one segment of each of the segment groups that is within an upcoming time period, and an average of bit rates of the segments in the respective candidate combination is not significantly greater than the estimated throughput;

means for calculating, based on the priority values for the segment groups within the upcoming time period, a respective score for each respective candidate combination of the plurality of candidate combinations; and means for identifying, based on the scores for the candidate combinations, a winning combination from the plurality of candidate combinations, the selected segments being in the winning combination, wherein the winning combination has a score that is greater than or equal to the scores for each other one of the candidate combinations.

33. A non-transitory computer-readable storage medium having stored thereon instructions that, when executed, cause one or more processors to:

determine an estimated throughput;

receive, from a server device, information indicative of a respective priority value for each respective segment group of a plurality of segment groups, wherein:

for each respective segment group of the plurality of segment groups:

the respective segment group is a respective plurality of segments, each of the segments of the respective segment group corresponds to a respective temporal section of media content different from temporal sections of the media content to which segments of other segment groups of the plurality of segment groups correspond, each respective segment of the respective segment group represents the same respective temporal section of the media content, is retrievable individually, and is from a different representation of a plurality of representations of the media content, each of the representations being encoded at a different bit rate, and the respective priority value for the respective segment group indicates an importance of selecting a segment for the respective temporal section from a representation in the plurality of representations that has a higher bit rate than other ones of the representations, and the priority value for a first segment group of the plurality of segment groups is different from the priority value for a second, different segment group of the plurality of segment groups, the first segment group and the second segment group including respective segments from the same representation of the plurality of representations;

perform a selection operation that selects a segment of each respective segment group of the plurality of segment groups, wherein the instructions cause the one or more processors to perform the selection operation in part by causing the one or more processors to select the segments of each respective segment group based at least in part on the estimated throughput and the priority values for the segment groups; and process the selected segments.

34. The non-transitory computer-readable storage medium of claim 33, wherein the estimated throughput is a bandwidth of a communication network.

35. The non-transitory computer-readable storage medium of claim 34, wherein the instructions, when executed, cause the one or more processors to request the selected segments in accordance with an adaptive streaming network protocol.

36. The non-transitory computer-readable storage medium of claim 33, wherein the estimated throughput is an estimate of an amount of media data that the one or more processors are able to decode during an upcoming time period.

37. The non-transitory computer-readable storage medium of claim 33, wherein the instructions, when executed, cause the one or more processors to decode the selected segments.

38. The non-transitory computer-readable storage medium of claim 33, wherein the instructions, when executed, cause the one or more processors to:

identify a plurality of candidate combinations, wherein for each respective candidate combination of the plurality of candidate combinations:

the respective candidate combination includes one segment of each of the segment groups that is within an upcoming time period, and an average of bit rates of the segments in the respective candidate combination is not significantly greater than the estimated throughput;

calculate, based on the priority values for the segment groups within the upcoming time period, a respective score for each respective candidate combination of the plurality of candidate combinations; and identify, based on the scores for the candidate combinations, a winning combination from the plurality of candidate combinations, the selected segments being in the winning combination, wherein the winning combination has a score that is greater than or equal to the scores for each other one of the candidate combinations.

39. A method for providing video data via an adaptive streaming network protocol, the method comprising:

sending information indicative of a respective priority value for each respective segment group of a plurality of segment groups, wherein:

for each respective segment group of the plurality of segment groups:

the respective segment group is a respective plurality of segments, each of the segments of the respective segment group corresponds to a respective temporal section of media content different from temporal sections of the media content to which segments of other segment groups of the plurality of segment groups correspond, each respective segment of the respective segment group represents the same respective temporal section of the media content, is retrievable individually, and is from a different representation of a plurality of representations of the media content, each of the representations being encoded at a different bit rate, and the respective priority value for the respective segment group indicates an importance of selecting a segment for the respective temporal section from a representation in the plurality of representations that has a higher bit rate than other ones of the representations, and the priority value for a first segment group of the plurality of segment groups is different from the priority value for a second, different segment group of the plurality of segment groups, the first segment group and the second segment group including respective segments from the same representation of the plurality of representations; and sending requested segments via the adaptive streaming network protocol in response to one or more requests from a client device, the requested segments being ones of the segments specified by the one or more requests.

40. The method of claim 39, further comprising:
assigning the priority values to the segment groups; and
storing the priority values to a manifest file for the media content.

41. A computing device comprising:
one or more non-transitory computer storage media configured to store media data; and
one or more processors configured to:
send information indicative of a respective priority value for each respective segment group of a plurality of segment groups, wherein:
for each respective segment group of the plurality of segment groups:

the respective segment group is a respective plurality of segments, each of the segments of the respective segment group corresponds to a respective temporal section of media content different from temporal sections of the media content to which segments of other segment groups of the plurality of segment groups correspond, each respective segment of the respective segment group represents the same respective temporal section of the media content, is retrievable individually, and is from a different representation of a plurality of representations of the media content, each of the representations being encoded at a different bit rate, and the respective priority value for the respective segment group indicates an importance of selecting a segment for the respective temporal section from a representation in the plurality of representations that has a higher bit rate than other ones of the representations, and the priority value for a first segment group of the plurality of segment groups is different from the priority value for a second, different segment group of the plurality of segment groups, the first segment group and the second segment group including respective segments from the same representation of the plurality of representations; and send requested segments via an adaptive streaming network protocol in response to one or more requests from a client device, the requested segments being ones of the segments specified by the requests.

42. The computing device of claim 41, wherein the one or more processors are configured to:
assign the priority values to the segment groups; and
store the priority values to a manifest file for the media content.

43. A computing device comprising:
means for sending information indicative of a respective priority value for each respective segment group of a plurality of segment groups, wherein:
for each respective segment group of the plurality of segment groups:

the respective segment group is a respective plurality of segments, each of the segments of the respective segment group corresponds to a respective temporal section of media content different from temporal sections of the media content to which segments of other segment groups of the plurality of segment groups correspond, each respective segment of the respective segment group represents the same respective temporal section of the media content, is retrievable individually, and is from a different representation of a plurality of representations of the media content, each of the representations being encoded at a different bit rate, and the respective priority value for the respective segment group indicates an importance of selecting a segment for the respective temporal section from a representation in the plurality of representations that has a higher bit rate than other ones of the representations, and the priority value for a first segment group of the plurality of segment groups is different from the priority value for a second, different segment group of the plurality of segment groups, the first segment group and the second segment group including respective segments from the same representation of the plurality of representations; and means for sending requested segments via an adaptive streaming network protocol in response to one or more requests from a client device, the requested segments being ones of the segments specified by the requests.

44. The computing device of claim 43, further comprising:

means for assigning the priority values to the segment groups; and means for storing the priority values to a manifest file for the media content.

45. A non-transitory computer-readable storage medium having stored thereon instructions that, when executed by one or more processors of a computing device, cause the computing device to:

send information indicative of a respective priority value for each respective segment group of a plurality of segment groups, wherein:

for each respective segment group of the plurality of segment groups:

the respective segment group is a respective plurality of segments, each of the segments of the respective segment group corresponds to a respective temporal section of media content different from temporal sections of the media content to which segments of other segment groups of the plurality of segment groups correspond, each respective segment of the respective segment group represents the same respective temporal section of the media content, is retrievable individually, and is from a different representation of a plurality of representations of the media content, each of the representations being encoded at a different bit rate, and the respective priority value for the respective segment group indicates an importance of selecting a segment for the respective temporal section from a representation in the plurality of representations that has a higher bit rate than other ones of the representations, and the priority value for a first segment group of the plurality of segment groups is different from the priority value for a second, different segment group of the plurality of segment groups, the first segment group and the second segment group including respective segments from the same representation of the plurality of representations; and send requested segments via an adaptive streaming network protocol in response to one or more requests from a client device, the requested segments being ones of the segments specified by the requests.

46. The non-transitory computer-readable storage medium of claim 45, wherein the instructions, when executed by the one or more processors, cause the computing device to:

assign the priority values to the segment groups; and store the priority values to a manifest file for the media content.

* * * * *